(12) United States Patent
Nohrig

(10) Patent No.: US 6,953,038 B1
(45) Date of Patent: Oct. 11, 2005

(54) CONCENTRATING SOLAR ENERGY SYSTEM

(76) Inventor: Andreas Nohrig, Cacilienstrasse 43, Zell am Main (DE) 97299

(*) Notice: Subject to any disclaimer, the term of this patent is extended or adjusted under 35 U.S.C. 154(b) by 0 days.

(21) Appl. No.: 10/296,569

(22) PCT Filed: May 18, 2001

(86) PCT No.: PCT/EP01/05743

§ 371 (c)(1),
(2), (4) Date: Jun. 30, 2003

(87) PCT Pub. No.: WO01/90662

PCT Pub. Date: Nov. 29, 2001

(30) Foreign Application Priority Data

May 22, 2000 (DE) ............................... 100 25 212

(51) Int. Cl.[7] ................................................ F24J 2/12
(52) U.S. Cl. ..................... 126/694; 126/576; 126/578; 126/600; 126/605
(58) Field of Search ................................ 126/574, 575, 126/576, 577, 578, 600, 601, 602, 603, 604, 126/605, 692, 694; 359/591

(56) References Cited

U.S. PATENT DOCUMENTS

| | | | |
|---|---|---|---|
| 4,214,572 A | 7/1980 | Gonder | 126/425 |
| 4,291,679 A | 9/1981 | Kersavage | 126/438 |
| 4,351,319 A | 9/1982 | Robbins, Jr. | 126/425 |
| 4,602,613 A | 7/1986 | Barr | 126/424 |
| 5,758,938 A | 6/1998 | Osterwisch | 353/3 |
| 6,067,982 A * | 5/2000 | Harrison | 126/571 |

FOREIGN PATENT DOCUMENTS

| | | | | |
|---|---|---|---|---|
| DE | 27 15 334 A1 | 10/1978 | | F03G 7/02 |
| DE | G 84 27 130.2 U1 | 9/1985 | | F24J 2/10 |
| FR | 2 472 146 A | 6/1981 | | F24J 3/02 |
| FR | 2 512 181 A | 3/1982 | | F24J 3/02 |
| JP | 58-019655 | 2/1983 | | F24J 3/02 |
| WO | WO 82/00719 A1 | 3/1982 | | G02B 5/10 |
| WO | WO 97/49956 A1 | 12/1997 | | F24J 2/14 |
| WO | WO 01/090662 A3 | 11/2001 | | F24J 2/12 |

* cited by examiner

Primary Examiner—Jiping Lu
(74) Attorney, Agent, or Firm—Sierra Patent Group, Ltd.

(57) ABSTRACT

A concentrating solar energy system with a reflector having a specularly reflecting inner side and realized as a parabolic mirror with two axis steering which is carried by a base frame arranged in a support plane and which is provided with a receiver arranged in operation at, in front of or after the focal point of the parabolic mirror, with the parabolic mirror moreover being rotatable about an axis which stands at least substantially perpendicular to the support plane. The parabolic mirror is pivotable upwardly and downwardly about a pivot axis arranged in at least one of the region of the support plane and at a distance above or below the support plane. The pivot axis being displaceably arranged in at least one of a plane parallel to the support plane and in the support plane and with the displacement of the pivot axis contributing to the corresponding pivotal movement of the parabolic mirror. The pivotal movement of the parabolic mirror is assisted by at least one link arm which is hinged at one end in the middle region of the parabolic mirror and at the other end to the base frame.

20 Claims, 21 Drawing Sheets

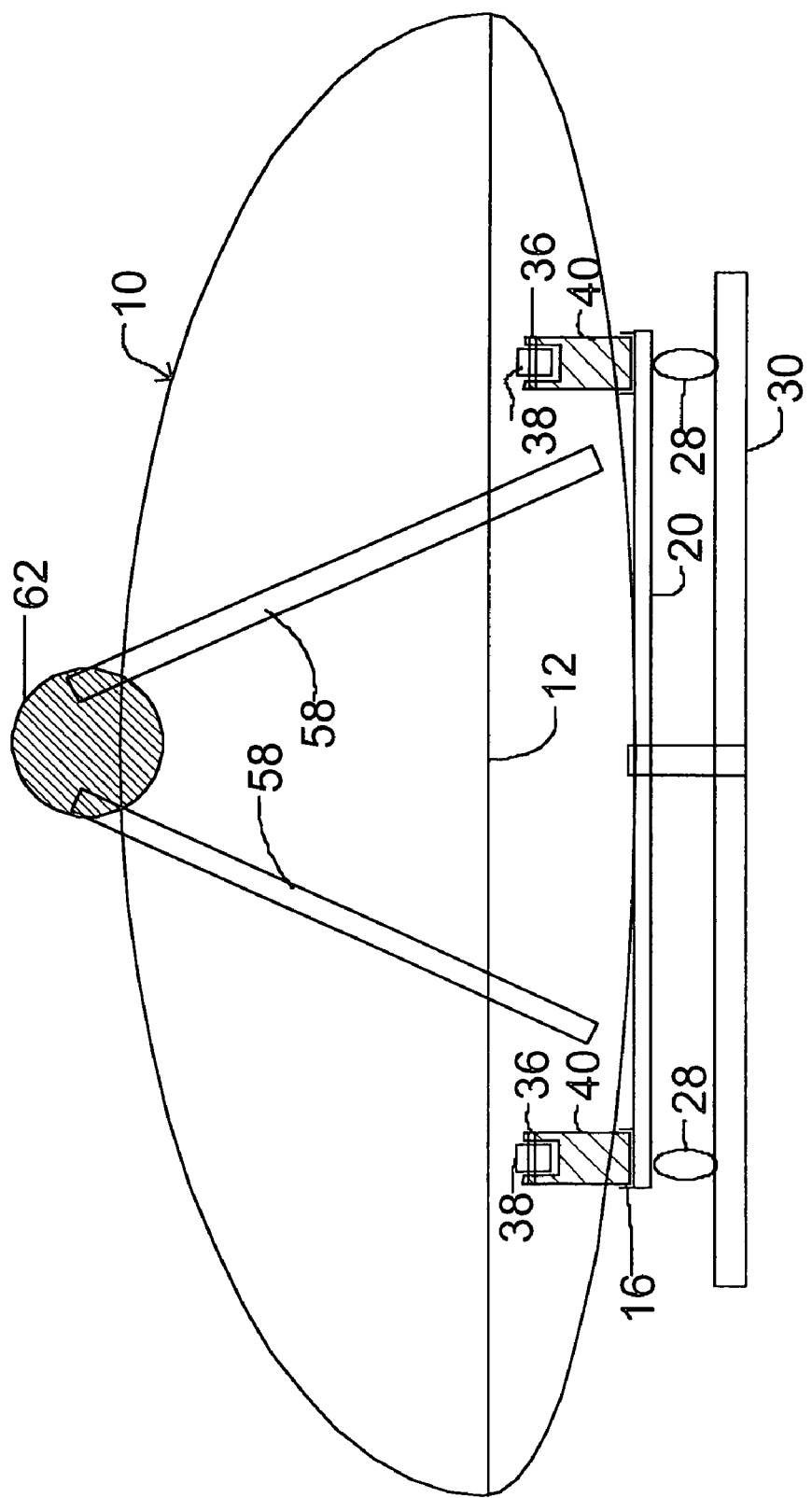

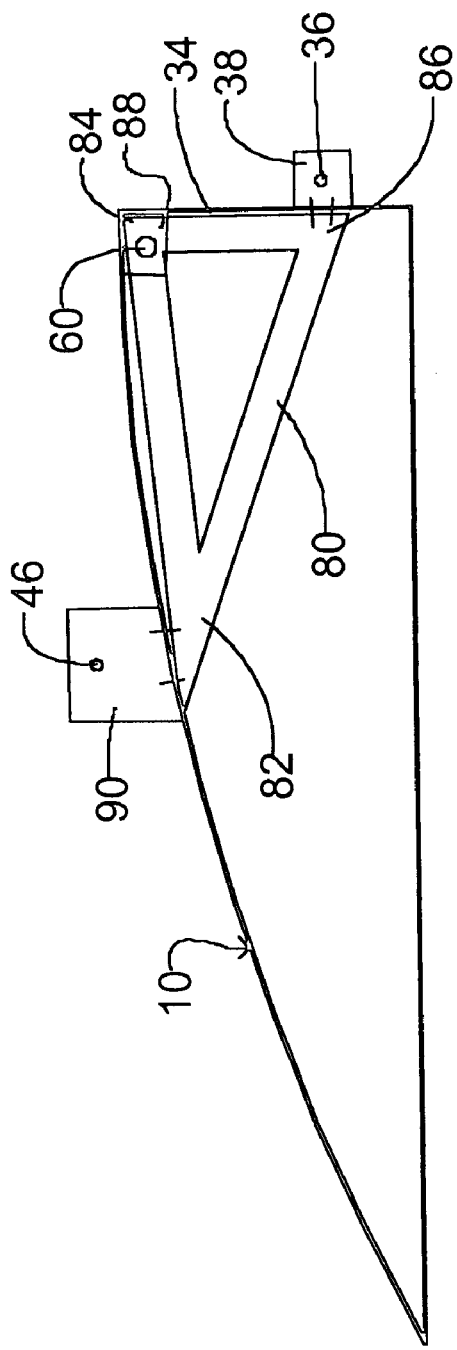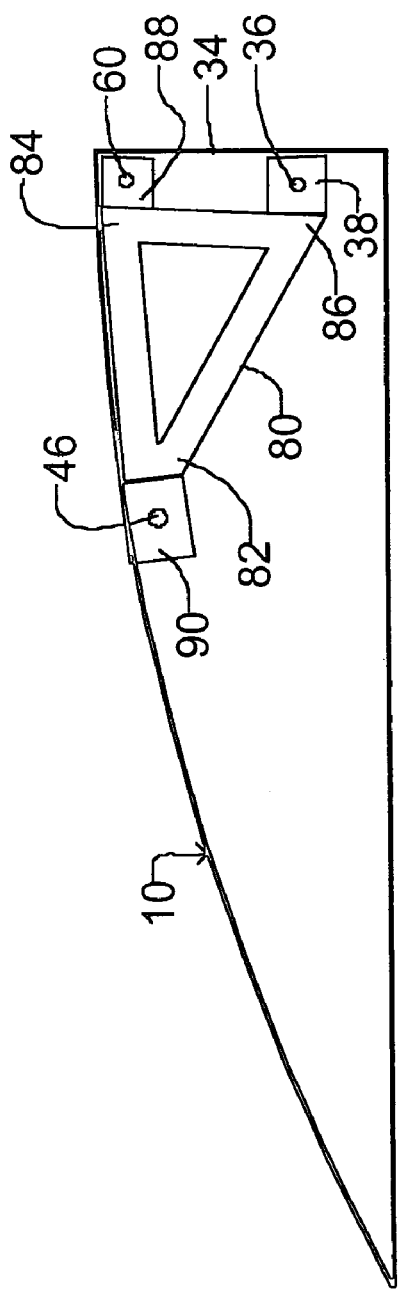

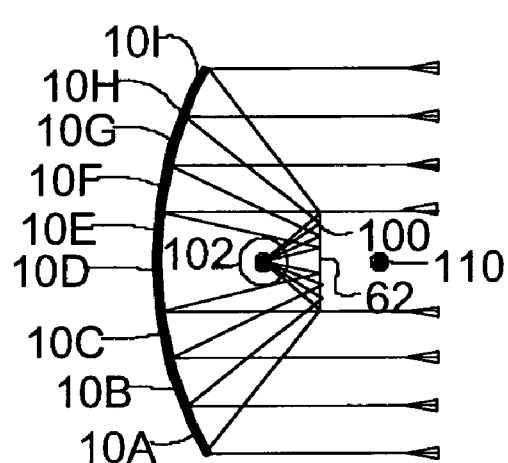
FIG. 11D
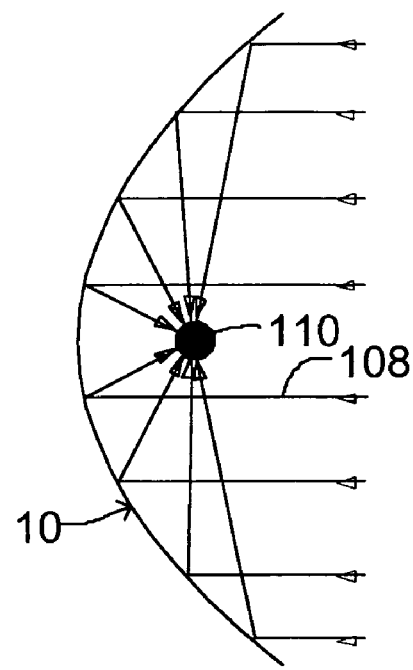
FIG. 11A
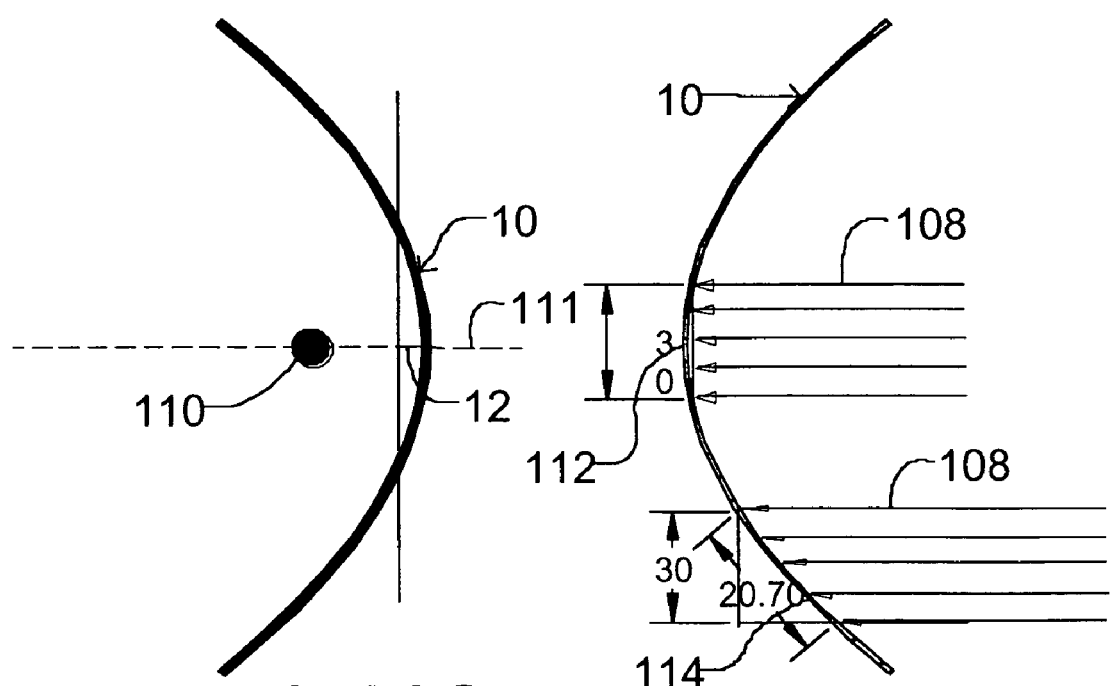
FIG.11C     FIG.11B

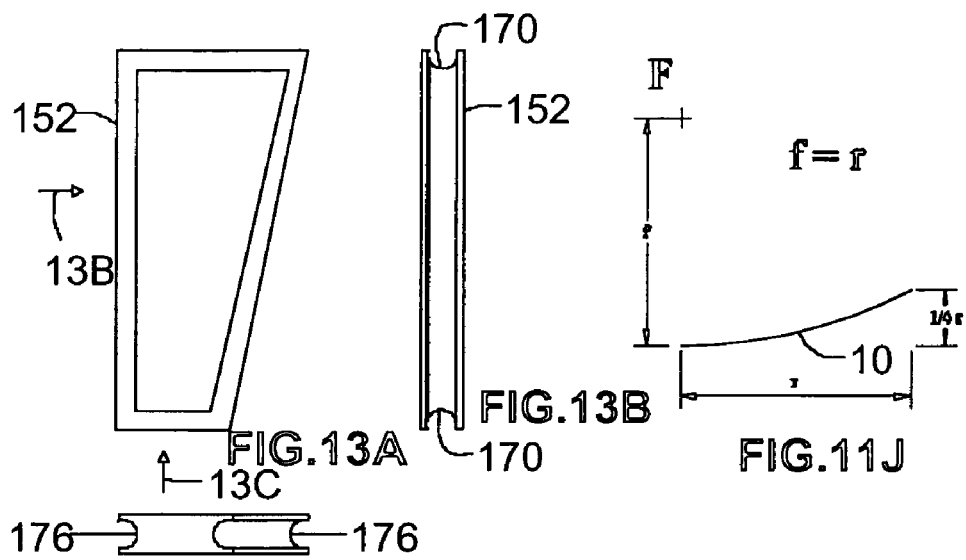
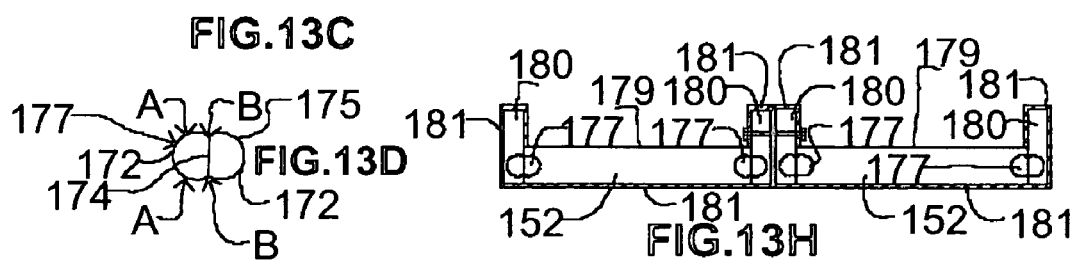
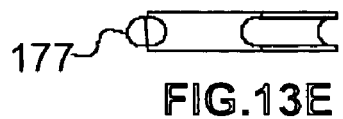
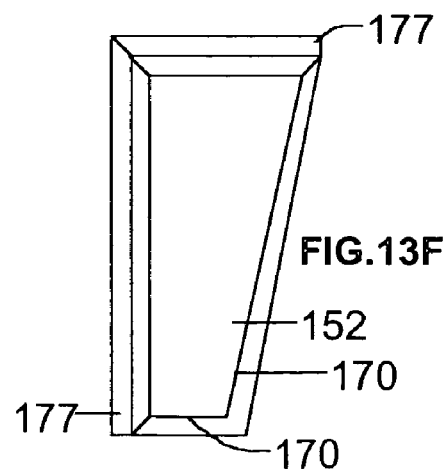

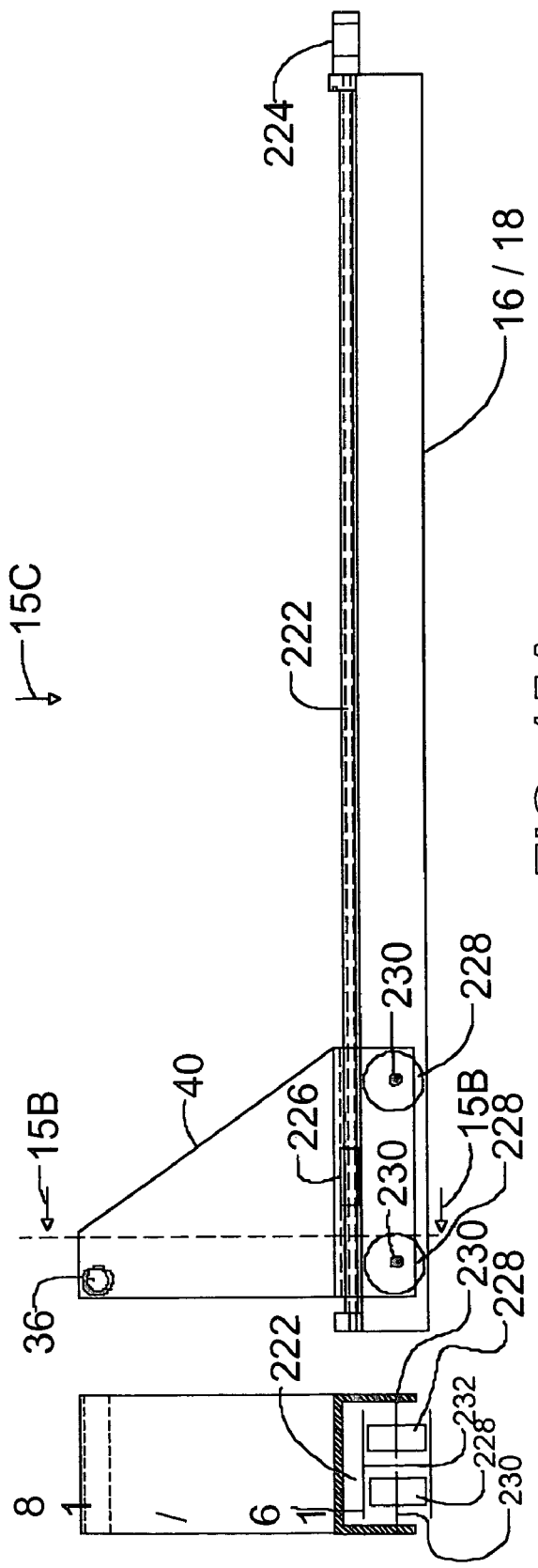

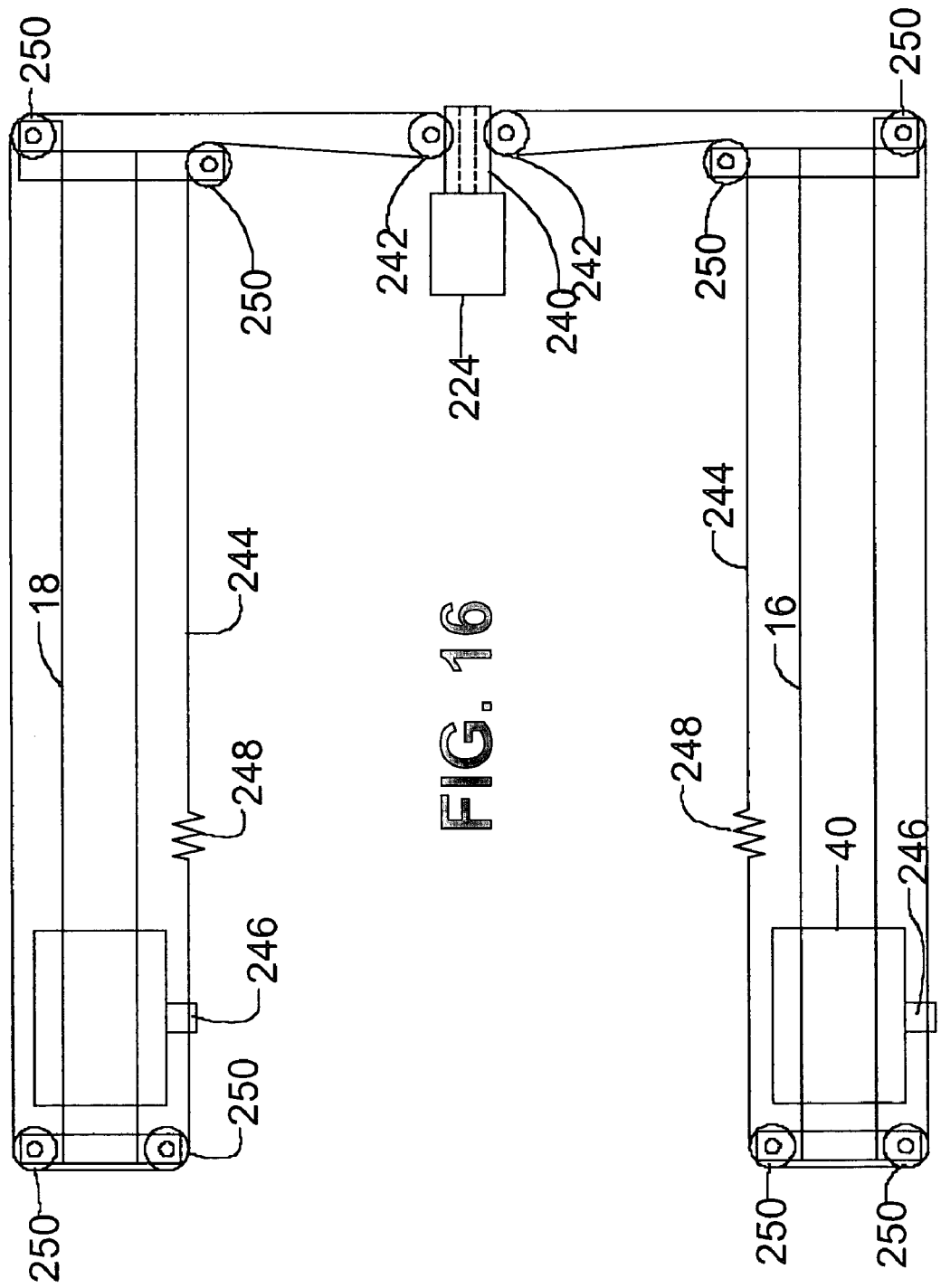

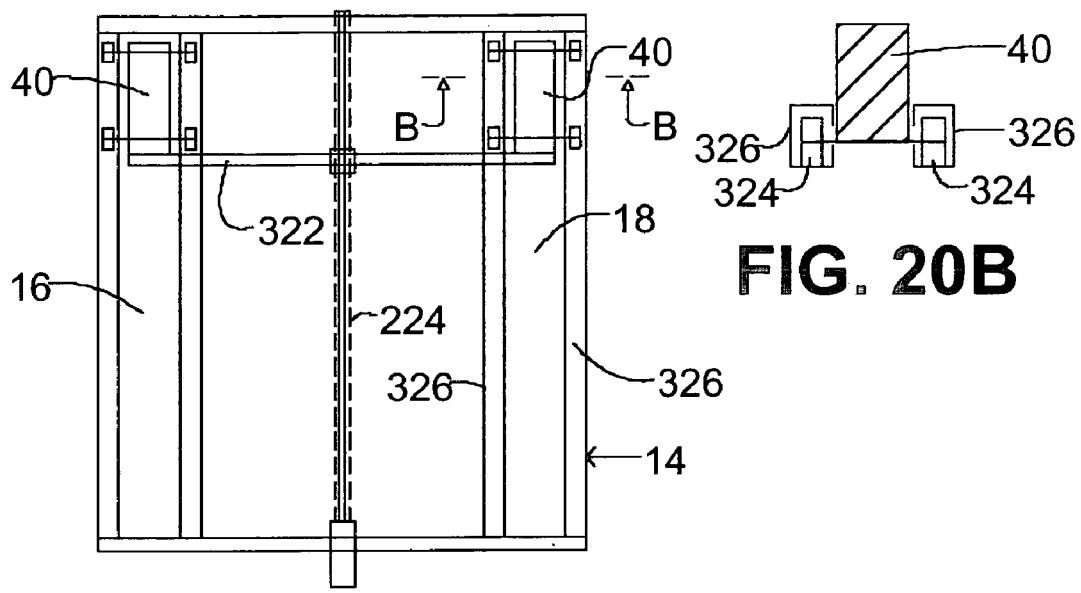
FIG. 20A
FIG. 20B
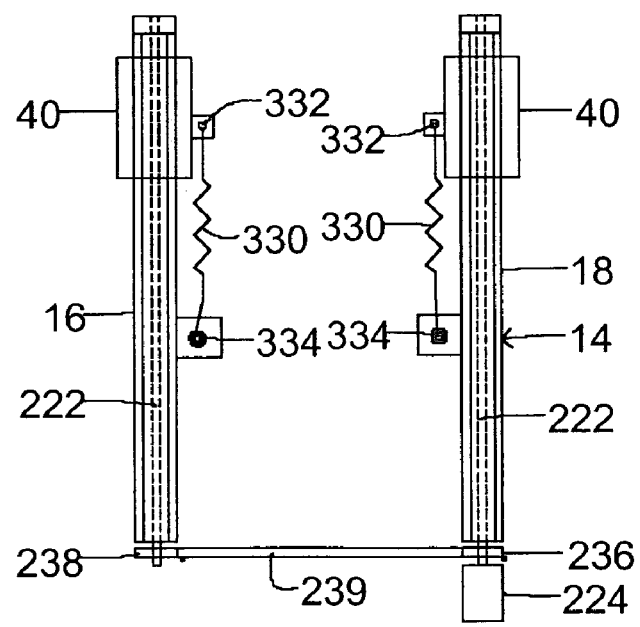
FIG. 21

CONCENTRATING SOLAR ENERGY SYSTEM

PRIORITY CLAIMS

This application claims first priority of German Patent Number 100 25 212.5 filed May 22, 2000 in the German language and the United States was timely specified as an Elected Country in the PCT patent application PCT/EPO/05743 filed on May 18, 2001.

BACKGROUND

The present disclosure relates to a concentrating solar energy system with a reflector having a specularly reflecting inner side realized as a parabolic mirror with two axis steering which is carried by a base frame arranged in a support plane and with a receiver which is arranged in operation at, in front of or after the focal point of the parabolic mirror, wherein the parabolic mirror is moreover rotatable about an axis arranged substantially perpendicular to the support plane.

The solar energy installations which have previously been realized can be roughly divided into three groups: photovoltaic installations, which produce electrical current directly from sunlight, solar collectors which take up heat from sunlight areally and concentrating solar energy systems which strongly bundle the sunlight and are able to recover high-temperature energy in a receiver. The concentrating solar energy systems are physically characterised in that the energy can be exploited at a plurality of levels. In this way, efficiencies of over 70% can be achieved. For example, if heat is produced at 600° C. then this can be exploited in the range from 600° C. to 100° C. for the generation of electrical current. The waste heat which arises can then be used in the form of hot water at ca. 90° C.

These concentrating systems have the disadvantage that they have to be steered to follow the sun, which can be very complicated with large areas. Three different types of concentrating solar energy systems can be distinguished: solar tower power stations in which the steering to follow the sun takes place with the aid of heliostats, parabolic channel systems which only have to be steered to follow the sun vertically and parabolic reflectors with two-axis steering.

Suggestions for the realization of solar energy installations and also for the possibility of using Stirling engines, which can be used amongst other things as a drive for power generators, as well as possibilities of storing energy, are described in the book "Stirlingmaschinen—Grundlagen. Technik. Anwendung by Martin Werdich ISBN 3-922964.35-(4" (Stirling engines-principles. Technology. Utilisation) The book shows in FIG. 53 a parabolic reflector with two-axis steering which is circular in plan view and is carried by a complicated base frame and a framework mounted thereon. The parabolic mirror is supported in space facing the sun and is pivotable about a horizontal axis which is located parallel to a diameter of the parabolic mirror, which is circularly round in plan view, in front of its specularly reflecting surface in order to enable vertical steering in accordance with the vertical position of the sun. This vertical steering is termed elevational steering or height steering in specialist language. Moreover, a rotation of the parabolic mirror about an axis perpendicular to the base frame is possible. This rotation brings about the horizontal steering to follow the sun.

A similar construction is known from the German utility model G 8427130.2. There, a part paraboloid is used as a reflector in place of a full paraboloid and extends over approximately 240° around the axis of symmetry of the paraboloid. Here, the vertical steering takes place about a pivot axis which is fixedly arranged at the base frame, and indeed at a significant height above the base frame.

Problematic with this known construction is above all the arrangement of the horizontal axis which serves for the vertical steering to follow the sun.

Problems arise with this arrangement in that the parabolic reflector must be arranged so high above the ground that sufficient ground clearance exists for the vertical steering. The center of gravity of the system thus lies at a very high position.

In large systems, in which the diameter of the parabolic reflector amounts to 10 m–20 m, this leads to very massive embodiments weighing tons, because the construction must also be storm-proof.

With this construction the sensitive reflector surface cannot be simply protected against environmental effects, such as precipitation. In this way, a considerable cleaning effort arises which also leads to increased wear of the reflector surface. Soft, favorably priced materials, such as reflecting plastic foils, cannot be used for the reflector layer. The mirror would become prematurely dull.

Furthermore, it is completely inconceivable to place a system of this kind on the flat roof of a normal building, because it is too heavy and would project too far above the house. The roof of a house is, however, actually the most favorable position for the installation of solar energy systems, because there is little shade here and the otherwise unused surface can be exploited. Furthermore, the energy transport path is very short, i.e. the system is suitable for decentral energy supply.

SUMMARY

Starting from this prior art the present invention is based on the object of so constructing a concentrating solar energy system with two-axis steering that a higher stability of the arrangement is achieved with considerably less cost and complexity than previously and that the parabolic mirror can be brought into a rest position in the absence of radiation from the sun in which the system only offers small areas of attack for wind, is absolutely storm-proof and the reflective layer is protected against precipitation. Furthermore, the system should be capable of being installed on the flat roof of a building and should indeed be able to replace the roof, i.e. to take on the function of the roof.

In order to satisfy this object provision is made, in accordance with the invention and in accordance with a first principle of solution, that the parabolic mirror is pivotable upwardly and downwardly about a pivot axis arranged in the region of the support plane or at a distance above or below the latter, with the pivot axis being displaceably arranged in a plane parallel to the support plane or in the support plane and with the displacement of the pivot axis leading or contributing to the corresponding pivotal movement of the parabolic mirror and in that the pivotal movement of the parabolic mirror is assisted by at least one link arm which is hinged at one end in the middle region of the parabolic mirror and at the other end to the base frame. The parabolic mirror is preferably so designed that it has in operation a lower edge which is arranged at least substantially directly adjacent to the support plane and which extends in plan view either in a straight line or is slightly curved, with the parabolic mirror being pivotable upwardly and downwardly about a pivot axis which is arranged in the region of its lower edge and at least substantially parallel to the support plane and which is linearly movable over the base frame.

Since the parabolic mirror is provided with a lower edge in operation which in plan view either extends in a straight line or is slightly curved, it is possible to arrange the pivot axis of the parabolic mirror in the region of this lower edge and thus in the direct vicinity of the support plane, i.e. of the base frame, so that the pivot axis only has to be arranged slightly above the ground and the center of gravity of the parabolic mirror is always only arranged just as high as necessary above the ground. In this way the mechanical requirements for the support of the parabolic mirror are substantially less than in the known arrangement, whereby the entire structure is simpler to realise and lighter. The base frame can so to say be used to directly support the pivot axis and it is no longer necessary to manufacture a huge frame construction in three dimensions in order to support the parabolic mirror with two-axis steering. Even when the parabolic mirror is now quasi a halved parabolic mirror, i.e. a half paraboloid, which extends through approximately 180° about the axis of symmetry, then this does not signify any loss of effective surface of the parabolic mirror, because the length of the lower edge of the parabolic mirror and thus its effective area can be straightforwardly enlarged without the design becoming significantly heavier as a result. Thus, the invention offers substantial advantages for the same areal extent as the parabolic mirror known per se.

Having regard to the vertical steering of the parabolic mirror, the pivot axis of the parabolic mirror is moved over the base frame in accordance with the invention, with the aid of a linear drive (positioning drive) in order to hereby produce the upward pivotal movement and the downward pivotal movement of the parabolic mirror.

In this way the following advantages are achieved amongst others:

Through the pivotal movement of the parabolic mirror associated with the linear mobility of the pivot axis of the parabolic mirror, the center of gravity of the parabolic mirror is always kept approximately above the center of the base frame with respect to the base frame, so that particular stability is achieved against the forces which act.

Through the arrangement of the lower edge of the parabolic mirror essentially directly adjacent to the support plane, in combination with the pivotal movement which is achieved by movement of the pivot axis over the base frame directly adjacent to the support plane, the stability of the construction is increased still further.

For the vertical steering to follow the sun, by changing the position of the parabolic mirror combined with the pivotal movement, the parabolic mirror is always only raised relative to the base frame just so far as is actually necessary for this purpose, which in turn increases the stability, i.e. the center of gravity always remains in a low position.

The displaceability of the pivot axle over the base frame makes it possible to close the paraboloid shut, so that the mirror surface faces downwardly and is thus protected against unfavorable environmental influences.

Since the pivot axis is arranged in the vicinity of the base frame, the parabolic mirror can be pivoted downwardly to such an extent that it is used as a roof and the specularly reflecting surface faces downwardly and is thus protected against environmental effects, such as precipitation etc. In this downwardly pivoted state the parabolic mirror and the solar energy system itself is so positioned that only small areas of attack for wind are present and the system is absolutely storm-proof.

In this way the parabolic mirror can be pivoted downwardly relative to the base frame to such an extent that it sealingly or flushly contacts the supporting surface, i.e. a foundation, a ground base or a wall matched to the outline of the parabolic mirror. The parabolic mirror can be secured with simple means to the supporting substrate, so that it is attached in an absolutely storm-proof manner. At this point reference should briefly be made to the Japanese document 58019655. This document shows a matrix of lenses which is designed to obtain energy from the sun. The rectangular matrix is supported on a stand about a horizontal pivot axis, and the pivot angle of the matrix of lenses can be changed by a link arm which is hinged at its one end in the lower region of the matrix of lenses to the latter and at its other end to a thrust block which can be moved by means of a threaded rod in a horizontal plane. The entire arrangement is mounted on a base frame which is rotatable about a vertical axis. In this manner the matrix of lenses can always be so positioned that it faces the sun. It is, however, problematic in this construction that it also requires a very heavy design in practice in order to have the required stability against storm gusts. A possibility of pivoting the matrix of lenses downwardly, so that the lenses face downwardly and so that the center of gravity overall is low down, is not present in the selected construction and also not realisable because the stand which carries the pivot axis prevents a pivotal movement of this kind.

An elongate support structure preferably extends along the lower edge of the parabolic mirror and both stiffens the parabolic mirror as well as carrying the pivot axle.

In this manner a skillfully arranged mechanical attachment of the pivot axle to the parabolic mirror is achieved and the parabolic mirror itself can be made even lighter because the support structure contributes to stiffening it.

For the realization of the rotary movement about the vertical axis the base frame is rotatable by means of rollers or wheels on a circular track. In this arrangement the rollers or wheels can be attached to the base frame itself. This track can be formed on the ground, or on a foundation, or on walls. Alternatively, rollers or wheels can be arranged at discrete points along the circular track and supported at the ground or on a foundation. The base frame would in this example include a circular ring which can run on the rollers or wheels. If the wheels or rollers are secured to the base frame and if a flat firm foundation is available, for example, the concrete ceiling of the uppermost storey of a house or a flat roof, then this base forms the circular track. The wheels can then be directly set on this base. Such constructions can be realized at favorable price and the inherent strength of the ground or of foundations or walls enables a solid support of the parabolic mirror. At this point it should be brought out that although one normally arranges the base frame or the track horizontally, it is also straightforwardly possible to support the base frame or the track parallel to the ground on an inclined sloping plot of ground or on a wall which realises a corresponding inclined position, for example in the case that a steeper inclination of the roof should be desired for some reason or other in the downwardly pivoted state. With such an inclined position of the base frame, one only needs to take suitable measures to ensure that the base frame is secured against sliding out of position.

It is particularly favorable when the base frame is inclined to a horizontal plane, with the base frame being arranged higher in the region of the pivot axis in the upwardly pivoted state of the parabolic mirror, i.e. at the front, than at the rear, i.e. in the region of the pivot axis in the downwardly pivoted state. This can, amongst other things, be achieved in that the wheels which are arranged in the region of the pivot axis in the upwardly pivoted state of the parabolic mirror, i.e. at the front of the base frame, have a larger diameter than the wheels which are arranged in the region of the pivot axle in the downwardly pivoted state of the parabolic mirror, i.e. at the rear on the base frame.

In this way a situation is achieved in which, when the sun is at its highest point, and in particular at the equator, the paraboloid has achieved in the upwardly pivoted state a horizontal or almost horizontal position. Through the pre-inclination of the base frame, the required degree of the pivotal movement can be restricted, which has a positive influence on the geometry as a whole.

In accordance with a second principle of solution the present invention is characterised in that the parabolic mirror is pivotable upwardly and downwardly about a lower pivot axis arranged in the region of the support plane, or at a distance above or below the latter, with the pivot axis being displaceably arranged in a plane parallel to the support plane or in the support plane and with the displacement of the pivot axis leading or contributing to a corresponding pivotal movement of the parabolic mirror.

The displacement of the pivot axis in order to bring about the upward or downward pivoting of the parabolic mirror has the decisive advantage that the center of gravity of the parabolic mirror can always be arranged above the base frame and preferably always in the region of the vertical axis of rotation, so that a very stable arrangement results and the construction of the base frame does not need to be made excessively heavy in order to take account of a changing position of the center of gravity, because the center of gravity remains in or approximately in a constant position.

For the realization of the pivotal movement of the parabolic mirror the latter is connected via a link arrangement to the base frame and the pivot axis is made movable over the base frame. The link arrangement can consist in a first variant of the invention of at least one link arm which is pivotally connected at one end in the central region of the parabolic mirror at its rear side and at the other end to a support point which is carried by the base frame and is arranged behind the parabolic mirror.

The point of support can lie significantly above the base frame, for example at a level which lies somewhat above the maximum constructional height of the parabolic mirror in the downwardly pivoted state. In this way the link arm can be made straight, whereby it can be realized at favorable cost and with a low weight. This is, however, not absolutely essential and it can also be entirely advantageous for the support point to be arranged lower or indeed beneath the base frame, as will be later explained in more detail.

Preferably two or more link arms are provided which are pivotally hinged at respective points to the rear side of the parabolic mirror and to respective support points. The use of at least two such link arms leads to a stable construction which counteracts the tendency of the parabolic mirror to deform and thus likewise contributes to a light-weight construction.

In the region of the support point of each link arm at the base frame a cut-out in the parabolic mirror is preferably provided which extends from the point of intersection of the curvature of the parabolic mirror with the support structure of the parabolic mirror to an imaginary line between the pivot axis of the parabolic mirror and the hinge axis of the respective link arm at the parabolic mirror, or to a line parallel to it. In this way the parabolic mirror is stiffened and reinforced. Furthermore, the cut-out(s) make(s) it possible to move the support point for each link arm downwardly since the cut-out can accommodate the link arm, whereby it is possible to swing the parabolic mirror so far upwardly that the horizontal position is achieved.

It is in other respects advantageous when the edge of the parabolic mirror which is the lower edge in operation has cut-outs in the region of the base frame. This prevents the parabolic mirror striking against the base frame in the upwardly pivoted state and permits a larger pivotal movement of the parabolic mirror.

Instead of securing the link arm or the link arms to the rear side of the parabolic mirror it or they can be pivotally attached at one end in the middle region of the parabolic mirror to its specularly reflecting inner side and at the other end to a support point which is carried by the base frame and is located in the downwardly pivoted state of the parabolic mirror adjacent to the position adopted by the upper edge of the parabolic mirror in the upwardly pivoted state. In this arrangement two or more link arms are also preferably provided which are pivotally hinged to respective points at the inner side of the parabolic mirror and to the respective support point at the base frame. This arrangement of the link arm or of the link arms at the inner side of the parabolic mirror leads to the advantage that the entire mechanism is arranged beneath the parabolic mirror in the downwardly pivoted state and is thus protected in this rest position. It makes sense to introduce such a special rest position because the system only has to be active in fair weather, i.e. with sunshine. With precipitation and storm the sun is not shining and thus the system can serve as a roof, since a firm roof is specifically required or only required with regard to the weather when the sun is not shining.

For the movement of the pivot axle on the base frame a positioning drive driven by a drive motor is preferably provided. A plurality of possibilities exist for the realization of the positioning drive. On the one hand, the positioning drive can be a threaded spindle journalled on the base frame which engages in a corresponding thread, i.e. in a corresponding threaded nut which is located in a thrust block which belongs to the structure carrying the pivot axle.

One thrust block is preferably provided for each pivot bearing of the pivot axle. A threaded spindle is thus associated with each pivot bearing of the pivot axle and engages in the region of the thrust block for the parabolic mirror, i.e. at the support structure for the parabolic mirror. When a plurality of threaded spindles are provided, these must be synchronously driven, which can, for example, take place by means of a chain drive which simultaneously drives both spindles.

When using a plurality of thrust blocks carrying the pivot axle and a number of positioning drives differing from the number of the thrust blocks, the thrust blocks can be firmly connected together to form an assembly and the positioning drive or the positioning drives can be so attached to the assembly that the driving forces are at least substantially uniformly distributed to the thrust blocks.

As an alternative to the use of threaded spindles, the positioning drive can be a chain drive, the chain of which runs around two chain sprockets pivotally journalled on the base frame and is secured at a point in the region of the pivot axis to the parabolic mirror. A chain drive can, for example, be associated with each pivot bearing of each pivot axle and the chain drives can be synchronously driven, for example in that the chain drive sprockets are driven via a common shaft.

The positioning drive can, however, also be realized differently. For example, the positioning drive can be a hydraulic drive or a rack, a toothed belt or a chain can be secured to the base frame and mesh with a driven pinion which is mounted at the thrust block or at each thrust block. For the movement of the thrust blocks circulating cable pulls can also be considered which are preferably executed with at least two rollers so that the one end of the cable is wound up and the other end is simultaneously unwound.

It is not essential to provide a drive for each thrust block. It is ultimately sufficient if a drive is provided at one thrust block and guide devices are provided at the other thrust block or at the other thrust blocks which are guided on guide bars or rails at the base frame. Irrespective of which positioning drive is selected, the latter is preferably so designed that the mirror remains in a position to which it has been moved. This can be achieved in that the positioning drive is so designed that it is non-reversible, i.e. so that the motor can drive the parabolic mirror but forces, which are exerted on the parabolic mirror, cannot lead to a displacement of the same. This can also be realized in that the drive motor acts as a brake or has a brake in order to keep the positioning drive in the position to which it has been respectively directed. Self-holding is preferably exploited for the fixation of the thrust blocks and this can be achieved, for example, in a worm-wheel transmission.

It is particularly favorable if a spring or a plurality of springs, for example in the form of a rubber cable or a plurality of rubber cables is or are provided in order to assist the positioning force of the motor or motors provided for the pivoting of the parabolic mirror. In this way, the positioning force to be delivered by the motors can be reduced so that the motor or motors and the entire construction can be made lighter. For the pivotal movement of the parabolic mirror a customary garage door drive can be used in advantageous manner, whereby the positioning drive can be realized at a favorable price.

It is particularly favorable when the receiver is carried at one end of a carrier arm, the other end of which is pivotally hinged in the region of the lower edge of the parabolic mirror, preferably to the support structure and can be co-pivoted upwardly on upward pivotal movement of the parabolic mirror. The upward pivoting of the receiver can take place simply by contact of the carrier arm on the support structure. That is to say that no separate positioning device is necessary for the receiver. This arrangement has moreover the advantage that in the downwardly pivoted state of the parabolic mirror the receiver is always covered over by it and protected. For heavy receivers a cable can be tensioned between the receiver and the inner side of the mirror, so that the high lever forces can be taken up.

It is moreover possible to provide one or more springs, for example in the form of a rubber cable or a plurality of rubber cables, which extends or extend from the receiver to the front part of the base frame and is or are tensioned in the upwardly pivoted state of the parabolic mirror. In this way a torque is produced at the parabolic mirror. This has the advantage that the springs or rubber cables can take up a major part of the holding forces when the parabolic mirror is swung open by the maximum amount and assists the positioning drives during the downward pivoting of the parabolic mirror. A relatively large positioning force is especially required for the movement of the parabolic mirror from the state in which it is pivoted upwardly by a maximum amount into a further downwardly pivoted state and, as a result of the spring force, this positioning force now only has to be partly generated by the positioning drive.

Furthermore, the receiver and the link arms are held in their desired position in the opened up state of the parabolic mirror.

It is also possible to provide one or more springs, for example in the form of a rubber cable or a plurality of rubber cables which extends or extend from the front side of the base frame to a support structure for the parabolic mirror arranged in the region of the edge of the parabolic mirror which is the lower edge in operation, the rubber cable or cables being tensioned in the downwardly pivoted state of the parabolic mirror. These springs, which are no longer tensioned in the upwardly pivoted state of the parabolic mirror, provide a force during the initial upward pivotal movement of the parabolic mirror which assists the positioning drive and also reduces the maximum positioning force which is required, with the previously mentioned advantages.

The outer shape of the parabolic mirror is in principle uncritical. It can be approximately semicircular, rectangular, or rectangular with rounded corners in plan view and in the last named case the corners remote from the lower edge are in particular, rounded. A gentle curvature of the lower edge, which is evident in plan view, is restricted in its magnitude by the ground clearance in the region of the base frame. It is particularly preferred when the parabolic mirror has a shape which results through the curve of intersection between a semi-parabolic body of rotation and a plane standing transverse to the axis of rotation of the body of rotation. This construction ensures that the parabolic mirror has the smallest possible constructional depth.

It is particularly favorable when a liquid metal, for example zinc, is used as the heat carrier in the receiver. In the same way, molten salts, thermal oil, water or a hot gas engine (Stirling engine) can be directly used. With the aid of a secondary reflector the solar radiation energy can be directly concentrated onto a store which is located in or at the center of the base frame. Here, zinc could be a particularly good storage medium, because it melts at 420° C. and takes up 111 kJ/kg during the phase change. For the direct production of power, solar cells can also be provided at the focal point.

BRIEF DESCRIPTION OF THE DRAWINGS

The invention will be explained in the following in more detail with reference to embodiments which are shown in the accompanying drawings. These show:

FIG. 16 shows a plan view in accordance with FIG. 15C, but of a further arrangement in accordance with the invention for the vertical steering of the parabolic mirror, and FIGS. 17, 18A, 18B, 19A, 19B, 19C, 20A, 20B, 21, 22A, 22B and 22C show modifications of the previously described constructions which are regarded as being particularly advantageous.

DETAILED DESCRIPTION

Figure 1:
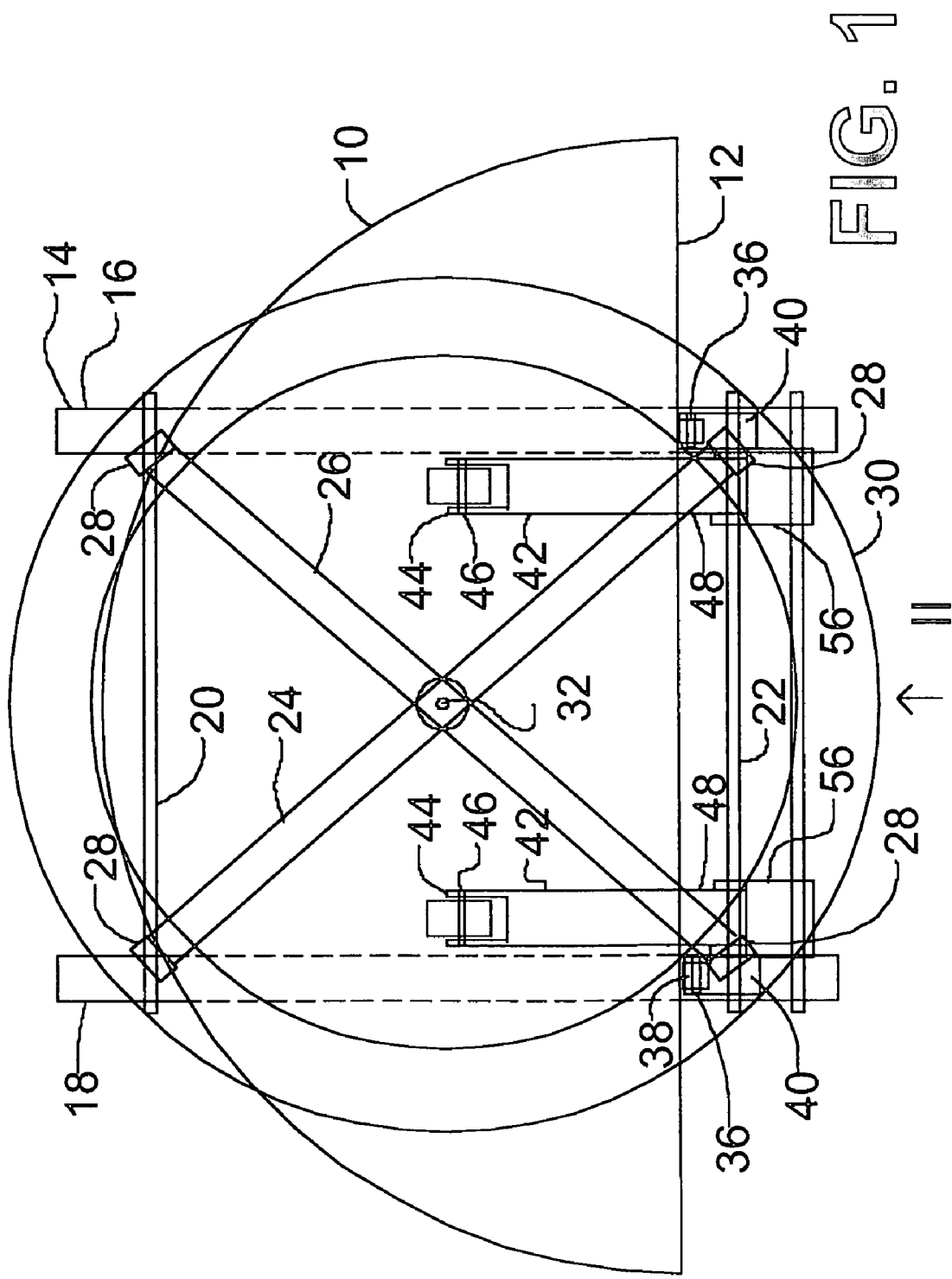
FIG. 1 a plan view of an exemplary concentrating solar energy system with a downwardly pivoted parabolic mirror, FIG. 2 a view of the solar energy system of the invention of FIG. 1 as seen in the direction of the arrow II of FIG. 1, i.e. from the rear, FIG. 3 a side view of the solar energy system of FIG. 2 of the invention as seen in the direction of the arrow III, FIG. 4 a front view of the solar energy system of the invention in accordance with FIGS. 1 to 3 in the upwardly pivoted state, FIGS. 5A–5E a series of sketches to explain the upward pivoting of a parabolic mirror of the solar energy system in accordance with FIGS. 1 to 4, FIGS. 6A–6C a series of sketches similar to the series of sketches 5A–5E but for a further particularly preferred variant of the concentrating solar energy system of the invention, FIGS. 7 and 8 two further examples in accordance with the invention of a parabolic mirror with inbuilt triangular stiffening frames, FIGS. 9A and 9B drawings corresponding to FIGS. 5A and 5D to explain a further variant of the concentrating solar energy system of the invention, FIGS. 10A and 10B drawings corresponding to the drawings 6A and 6C for the explanation of a further variant of the solar energy system, FIGS. 11A–11J drawings to explain different possibilities for the realization of a parabolic mirror in accordance with the invention, FIGS. 12A–12D drawings which show various possibilities as to how a parabolic mirror in accordance with the invention can be manufactured from segments, FIGS. 13A–13H drawings which show a technical possibility in accordance with the invention for the manufacture of a parabolic mirror from individual segments consisting of extruder foam, with the FIGS. 13B and 13C showing views of the segments of FIG. 13A in accordance with the arrows 13B or 13C, FIG. 13D showing a connection element, which likewise consists of extruded polystyrene or polyurethane foam and can optionally be cut out of the segment in accordance with FIG. 13A, FIG. 13E a drawing corresponding to the representation of FIG. 13C, but with an inserted connection element according to the invention and in accordance with FIG. 13D, FIG. 13F a plan view of a segment similar to FIG. 13A, but with connection elements in accordance with FIG. 13D mounted in accordance with the invention, FIG. 13G a representation corresponding to the lower right-hand sector 142 of FIG. 12B and FIG. 13H the connection of two smaller segments to one another in accordance with the section plane 13H—13H of FIG. 13G, FIG. 14 a plan view of an arrangement in accordance with the invention similar to FIG. 1, but without parabolic mirror and the linkage associated therewith in order to show a possibility for the horizontal steering, FIGS. 15A–15C drawings which show a drive in accordance with the invention which can be used for the vertical steering of the parabolic mirror of the invention, with the FIG. 15B showing a sectional drawing in accordance with the section plane 15B—15B in FIG. 15A and FIG. 15C being a plan view on FIG. 15A in the direction of the arrow 15C.

FIG. 1 shows first of all a plan view of the rear side of a parabolic mirror 10 in accordance with the invention in the downwardly pivoted state. One can see from this representation the lower edge 12 of parabolic mirror which appears straight in plan view and the substantially semicircular shape of the parabolic mirror.

The parabolic mirror 10 is attached to a base frame 14 in a manner which will be explained further, with the base frame consisting of two elongate beams 16 and 18 which are supplemented to an approximately square frame by means of transverse beams 20 and 22, with two diagonal struts 24 and 26 taking care of the required stability of the base frame. At the four corners of the base frame, in the region of the points of connection between the beams 16, 18 and the transverse beams 20, 22 there are four wheels 28 which can run on a circular foundation 30 in order to thereby enable a rotation of the base frame about the vertical axis 32.

Figure 2:
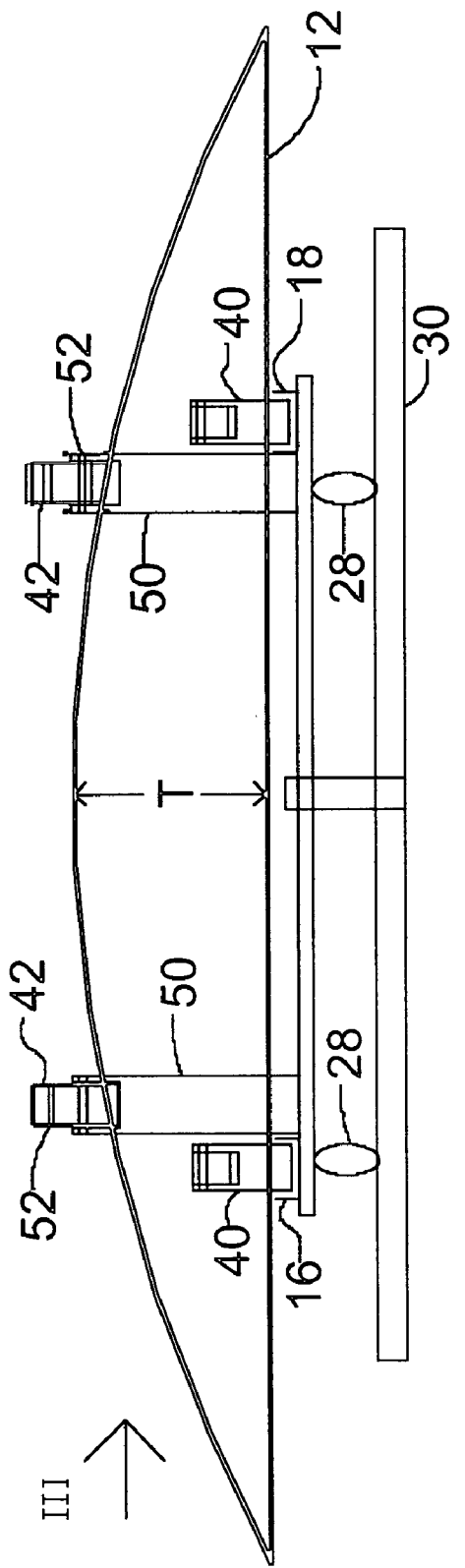

It can be seen from FIG. 2 that the parabolic mirror 10 has a relatively flat curved shape in the downwardly pivoted state and in the front view, with the maximum depth of the parabolic mirror being shown by T at the center.

In a practical embodiment the length of the lower edge 12 of the mirror can, for example, amount to approximately 8 m, so that the radial height of the mirror amounts to approximately 4 m and the maximum constructional depth T of FIG. 2 amounts to approximately 100 cm. It is straightforwardly evident from FIG. 2 that the total construction has a very low constructional height in the downwardly pivoted state and that the base frame can be constructed to be correspondingly low.

Figure 3:
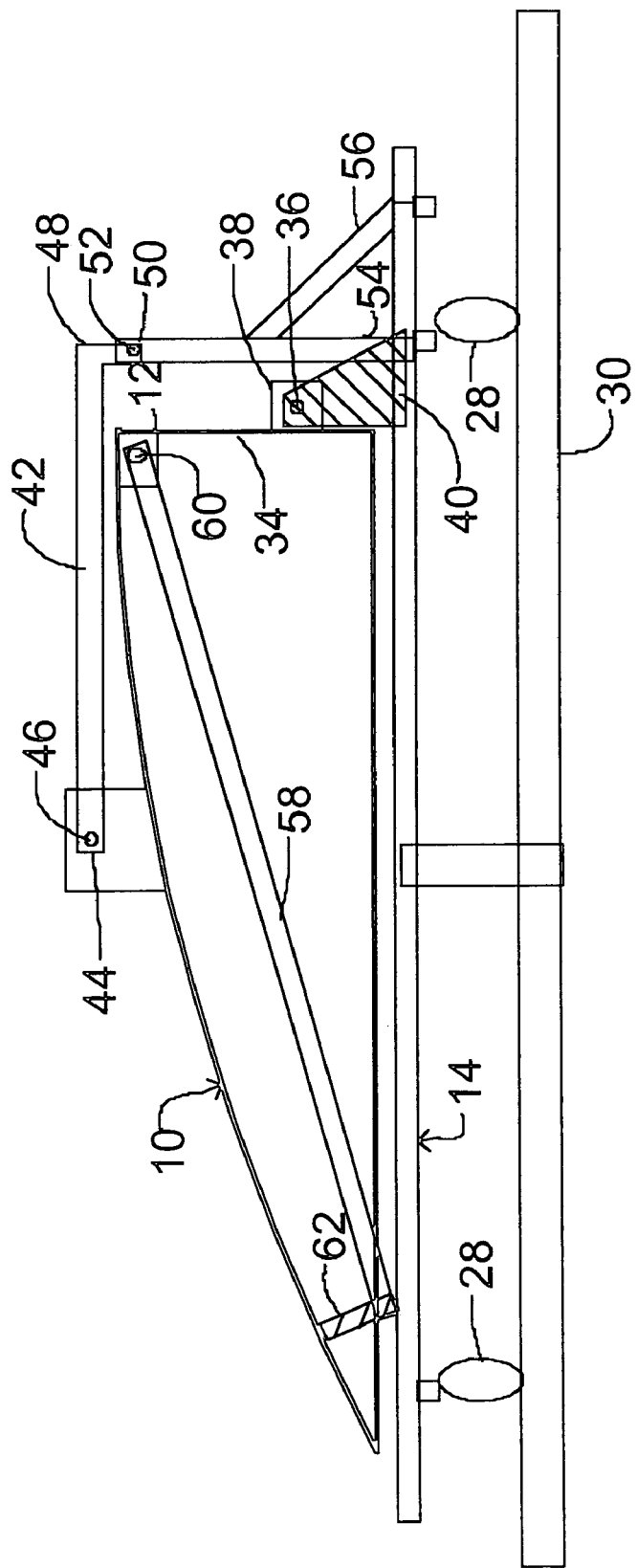

It can also be seen from the side view of FIG. 3 that a support structure 34 adjoins the lower edge 12 of the parabolic mirror and that the parabolic mirror is correspondingly stiffened by the support structure 34 through the connection of the parabolic mirror along the entire length of the support structure 34, i.e. along the entire curved surface in FIG. 2. I.e. the open surface of the paraboloid is closed in the third dimension at 34 and thus considerably stiffened. If high requirements are placed on stability spoke-like struts or tensioned cables can be used.

The support structure or stiffening 34 also serves for the pivotal suspension of the parabolic mirror about the pivot axis 36 which is defined by pins which are installed or journalled in lugs 38 attached to the support structure and in thrust blocks 40 displaceably guided on the base frame 14. As can be seen from FIG. 1 and FIG. 2, two thrust blocks 40 are provided in this example which are respectively arranged in one of the elongate beams 16, 18 realized as a U-shaped rail and are displaceable along the respective U-shaped rail 16, 18 for the upward pivoting and downward pivoting of the parabolic mirror about the pivot axis 36, as shown in FIGS. 5A–5E.

From the side view of FIG. 3 one can also see a link arm 42 which is pivotally connected at its one end, at the left end 44 of FIG. 3, about the hinge axis 46 to the rear side of the parabolic mirror in its central region and, at its other right end 48 at a support point 50 about a further pivot axis 52. The support point 50 is formed by a support post 54 which is secured to the base frame 40 and is stiffened by a corresponding strut 56. The support point in FIG. 3, i.e. the position of the pivot axis 52, is preferably not directly above the base frame. It is important that the point 46 in FIG. 3 must always remain above the line 52 and 36 in FIG. 3 in the upwardly pivoted state (see FIGS. 5B to 5E) because otherwise the mirror can no longer be swung closed. The thrust movement would otherwise produce a downwardly directed torque. The level of the support point 52 in FIG. 3 thus influences the maximum angle of upward pivoting of the mirror. This can lead to problems in the vicinity of the equator. The ideal height of 52 in FIG. 3 is probably at the same level as 36 in FIG. 3. This has to be established in practice. Since the hinge point 52 is located approximately at the maximum level of the parabolic mirror in the downwardly pivoted state the link arm 52 is made at least substantially straight and could be made completely straight if the support point 52 were to be placed slightly higher than shown in FIG. 3. In fact two link arms 42 are provided, as is evident from FIGS. 1 and 2, and they are arranged on the main frame directly adjacent to the thrust blocks 40.

Within the parabolic mirror 10 of FIG. 3 there are two support arms 58 of which only one is evident in FIG. 3, but with both support arms being visible in FIG. 4. Each support arm 58 is pivotally hinged at its one end at the parabolic mirror 10, and indeed at a hinge axis 60 in the region of the transition between the lower edge 12 and the support structure 34, and is connected at its other end to a receiver 62 which, in the upwardly pivoted state of the parabolic mirror of FIG. 4 is located at the focal point of the parabolic mirror.

The upward pivoting and the downward pivoting of the parabolic mirror 10 will be explained in more detail in the following with reference to FIGS. 5A–5E, with FIG. 5A corresponding to FIG. 3 but simply being to a smaller scale. This is the rest position of the parabolic mirror 10, i.e. the full downwardly pivoted state, and it is evident from the Figure that the receiver 62 and the support arms 58 and also the entire region beneath the parabolic mirror are covered over and protected by it. The specularly reflecting surface of the parabolic mirror, at its underside in FIG. 5A, is protected in this manner in the rest position.

If the sun now shines, measures are taken for a movement of the thrust block 40 in the direction of the arrow 70, whereby the parabolic mirror 10 is forced, as a result of the linkage arrangement 42, to pivot upwardly in the clockwise direction in the direction of the arrow 72 about the pivot axis 36 of the thrust block 40. The receiver 62 remains lying on the base frame (on the cross-beam 20) during this initial pivotal movement since the support arms 58 swing about the pivot axis 60, but is however pushed forwardly with the pivot axis 50. A guide rail can be attached to the base frame and rollers or sliding shoes can be attached to the receiver for the support of the receiver.

Figure 5C:
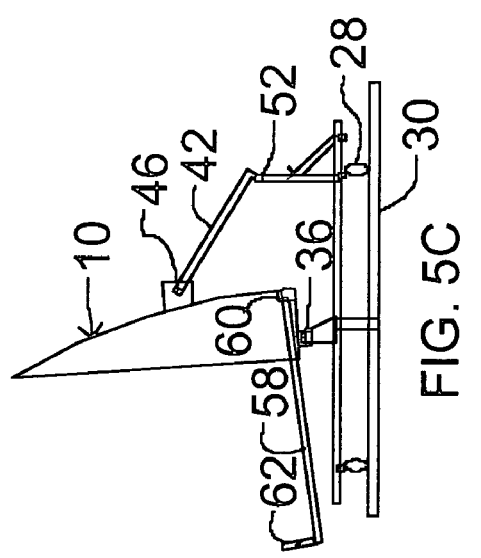
Figure 5B:
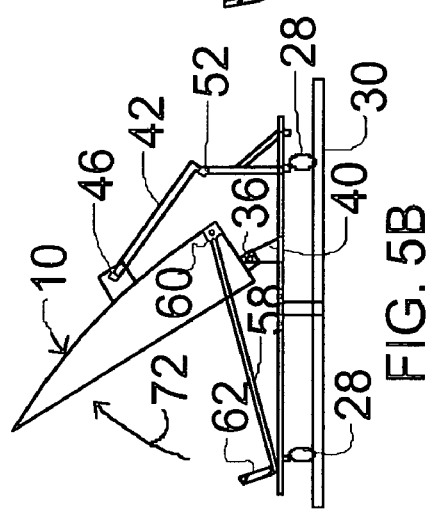

With progressive displacement of the thrust block 40 to the left one then reaches the position of FIG. 5C where the parabolic mirror 10 stands almost upright and one can see that in this position the support arms 58 come into contact with the support structure 34 and that the receiver 62 has already been slightly lifted hereby. The receiver 62 is now located at the focal point of the parabolic mirror.

With progressive displacement of the thrust blocks 40 to the left along the main beams 16 and 18 the parabolic mirror moves ever further towards the rear in accordance with FIG. 5D and subsequently FIG. 5E, which shows the maximum pivot angle of the parabolic mirror 10. This pivotal movement about the pivot axis 36 is the vertical steering of the parabolic mirror which is necessary to follow the respective elevation of the sun, so that the maximum solar intensity is received and concentrated on the receiver 62 located at the focal point.

When the sun sinks in the sky in the afternoon the pivot angle is progressively reduced from the maximum position of FIG. 5E, by displacement of the thrust blocks 40 to the right, so that, for example, the intermediate position of FIG. 5D and subsequently of FIG. 5C is achieved and the setting of the sun is followed by the parabolic mirror. During rotational movement about the pivot axle 36, for the steering of the parabolic mirror in dependence on the elevation of the sun, a simultaneously executed rotary movement about the vertical axis 32 (only shown in FIG. 1 and in FIG. 5D) takes care of the horizontal steering, i.e. the rotary movement in accordance with the arrow 74.

If, at the end of the day, or, for example, during snow or rain, no adequate radiation from the sun is any longer present a move is made to the fully downwardly pivoted state of FIGS. 3 and 5A and the parabolic mirror 10 now functions as a roof.

A wall or a support surface corresponding to the shape of the paraboloid can be so built that the paraboloid directly lies flat and fully sealed on it. Clasps can be attached to this wall which non-releasably connect the paraboloid to it so that the roof is absolutely sealed (up to being air-tight) and storm-proof. The paraboloid is thus also secured against pressure from above, for example with snow-loading. Effect of dome roof!

One can now easily imagine that a swimming pool or a part of a swimming pool is located beneath the parabolic mirror in FIG. 3 and can be heated, amongst other things, with energy which is collected by the parabolic mirror and focussed onto the receiver 62. The roof in the form of the downwardly pivoted parabolic mirror 10 could however likewise be the roof of a house or a region of the roof of a house. In other respects the mirror can also be used in the downwardly pivoted state for the illumination of the covered over space, since it is only necessary to arrange a single light source in the region of the focal point of the mirror, i.e. below the reference numeral 30 in FIG. 3 in order to relatively uniformly illuminate the space via the parabolic mirror. For this purpose lamps directed towards the ceiling, which are nowadays available at a very favorable price would be excellently suited for this purpose.

Figure 5E:
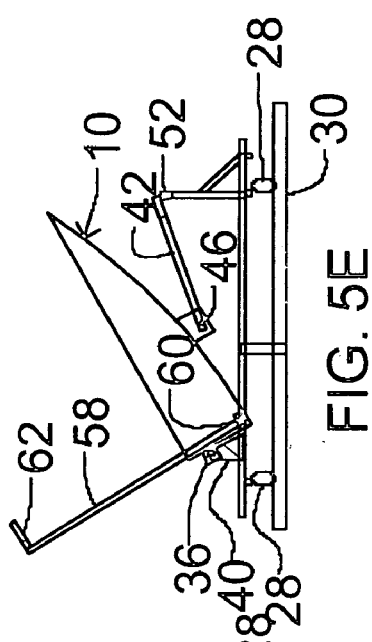
Figure 6A:
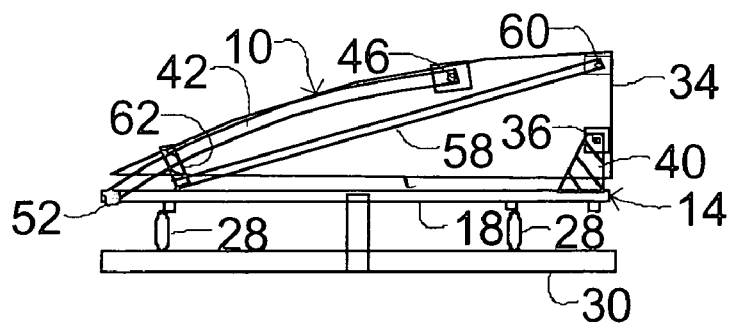
Figure 6B:
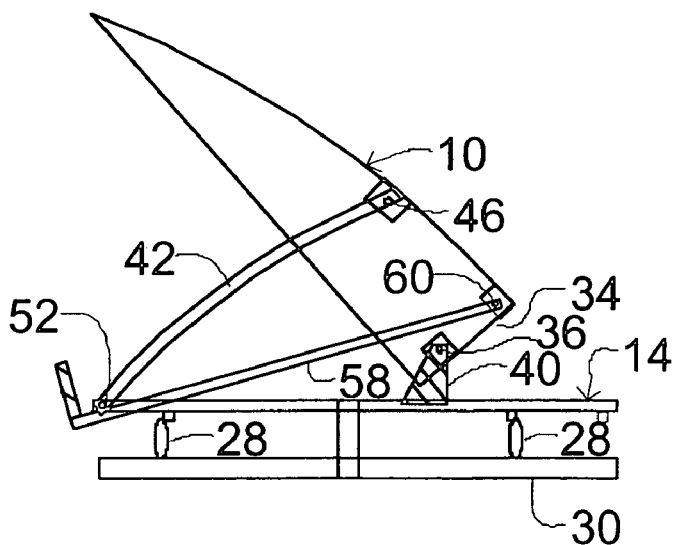
Figure 6C:
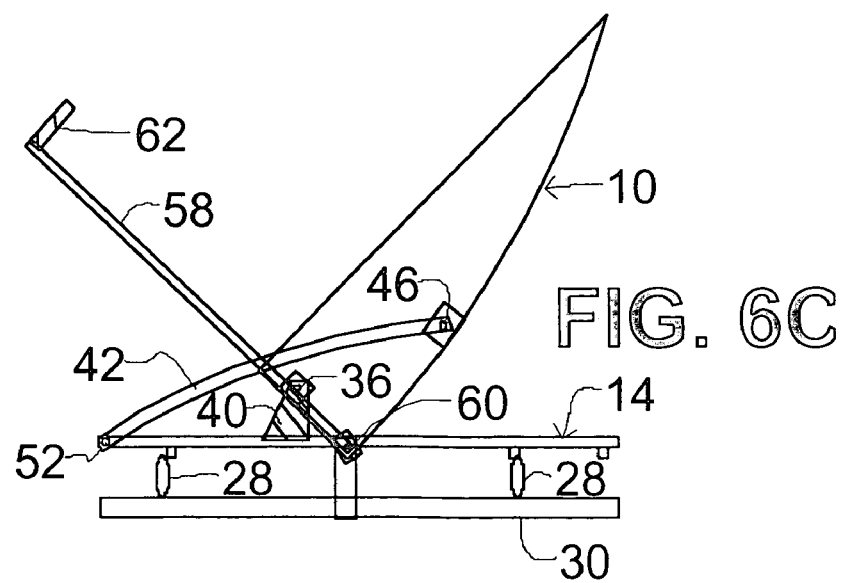

The FIGS. 6A–6C now show an alternative embodiment in which both the thrust blocks 40 and also the link arms 42 are fully accommodated in the downwardly pivoted state of the parabolic mirror 10 of FIG. 6A beneath the parabolic mirror and are thus best protected. This embodiment is superior in almost every respect and is thus preferred in practice. This construction is unbeatable as the roof of a house. A rectangular house can also be covered with two smaller systems, which will later be described with reference to FIG. 11E. In this embodiment the unfavorable lever relationships in the two extreme positions (fully closed and fully open) can easily be compensated with a vertical bar and an additional cable pull. The vertical bar would be arranged in such an embodiment in the region of the rounded edge of the parabolic mirror in FIG. 1 and are secured to the base frame. The cable would be so designed that it extends from a deflection roller at the top of the bar approximately vertically downwardly to the middle of the front edge of the parabolic mirror. Through a tensile force at the cable the parabolic mirror can then be initially lifted out of the closed position until the lever relationships become more favorable. In the extreme inclined position in FIG. 5E the cable can again be pulled in order to assist the closing movement. The cable can be loose or only slightly pre-tensioned between the two positions. The bar could also be exploited as a carrier for an elevated liquid reservoir with gravity circulation.

The same reference numerals will be used for the embodiment of FIGS. 6A–6C as were used for the embodiments of FIGS. 1–5 and the same description applies for parts having the same reference numeral as was given in connection with FIGS. 1–5, unless something to the contrary is stated.

As is evident from FIGS. 6A–6C the link arms 42, of which there are only two here (with only one being evident in the Figures) are pivotally hinged at their one end to the inner side of the parabolic mirror 10 at 46 and at their other end to the base frame 14 at 52. The thrust blocks 40 are now located at the "inner" side of the support structure 34. In this case the apertures 128 shown in FIG. 11I must be provided in the support structure 34 since the thrust blocks 40 have to move through the support structure 34 during the upward pivotal movement of the paraboloid, i.e. at the left side of this support structure in FIG. 6A. In this embodiment the receiver 62 is carried by two support arms 58 arranged in an A-shape which are pivotally hinged at respective pivot axes 60 in the region of the lower edge 12 in the operation of the parabolic mirror and its connection to the support structure 34.

The position of the individual suspension points must satisfy the following criteria in order to enable the upward and downward pivoting. In the variant shown in FIGS. 1 to 5 the path between FIG. 3:46 and FIG. 3:36 must always be shorter than the path between FIG. 3:46 and the foot point of the strut FIG. 3:50 on the base frame. In the particularly preferred variant in FIG. 6 the path between FIG. 6B:46 and FIG. 6B:36 must always be shorter than the connection between FIG. 6B:46 and the point FIG. 6B:52.

If these path ratios are not present the rotation of the paraboloid about the point 46 is restricted, i.e. the mirror could not be fully closed in the rest position.

In this embodiment the link arms 42 are slightly curved which is however not absolutely essential. In the embodiment of FIGS. 6A–6C the deployment of the parabolic mirror also takes place by movement of the thrust blocks 40 to the left or to the right, depending on whether the mirror is to be swung upwardly or swung downwardly.

Summarizing the following can be stated. In this example a semi-circular self-supporting reflector paraboloid 10 is so suspended at one or more points 52 and at one or more further points 36 that a movement of the thrust blocks 40 carrying the points 36 (same number of thrust blocks as attachment points 36) along a guide formed by the beams of the base frame brings about the scissor-like upward pivoting of the reflector 10. The thrust blocks 40 can either be driven individually or in combination. The drive can take place in any desired manner, especially however through a threaded bar which extends parallel to the rails 16 and 18 respectively, with a thread being provided in the thrust block 40 and with the movement taking place by rotation of the threaded bar. The drive can however also be achieved by racks, toothed belts or chains which are attached parallel to rails 16 or 18 respectively and by a driven pinion which is attached to the thrust block 40.

The mounting points 52 and/or the attachment points 60 are located within the reflector paraboloid. In this way a particularly compact construction is achieved. The entire mechanical system can be provided beneath the paraboloid and is protected in the rest position.

The attachment of the receiver 62 can also be particularly simply solved in these systems. It suffices to provide for mobile suspension at the inner corner of the paraboloid 10. On opening the system the receiver simply scrapes along the ground or along a simple lath until it is raised by the lower edge of the paraboloid and is then automatically located at the focal point of the paraboloid.

The FIGS. 7 and 8 each show a triangular brace 80 which serves for the stiffening of the parabolic mirror, with the triangular brace being designed in FIG. 7 in order to be used with the embodiments of FIGS. 1 and 5 whereas in FIG. 8 the brace is matched to the embodiment of FIG. 6. Both in the embodiment of FIG. 7 and also in the embodiment of FIG. 8 there are in each case two triangular braces provided for each parabolic mirror, the number of triangular braces which are used being selected in accordance with the number of link arms 42.

In both embodiments, the three apices of the triangle 82, 84 and 86 lie at points which are arranged adjacent to the respective pivot axles 46, 60 and 36 respectively. The triangular braces are preferably secured to the lugs or blocks 38, 88 and 90 which receive the pivot axles 36, 60 and 46 and are moreover bonded or secured to the parabolic mirror 10, or to the corresponding support structure 34. Through the triangular braces the positions of the pivot axles 36, 46 and 60 are uniquely fixed with respect to one another.

Figure 9A:
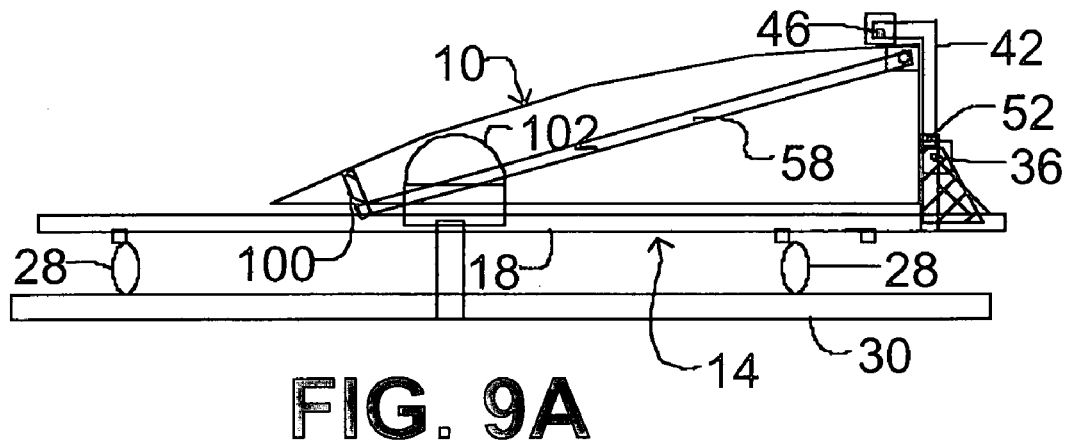
Figure 9B:
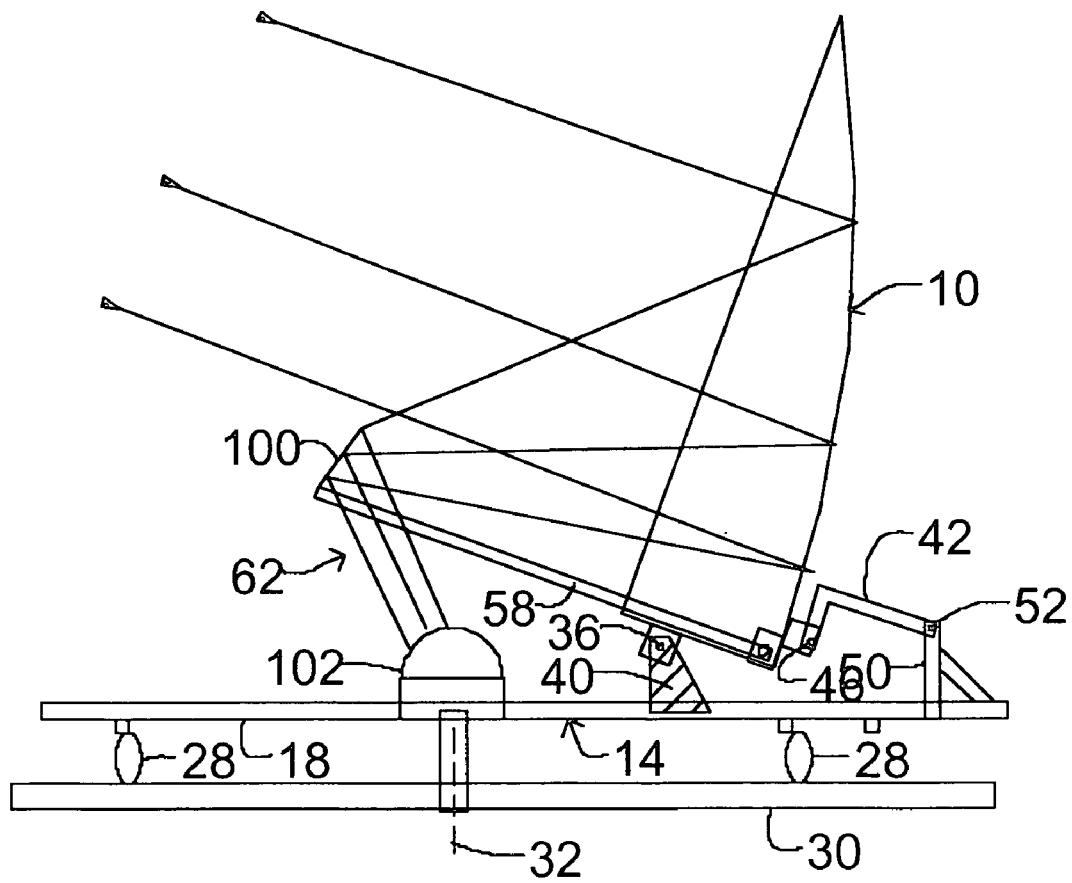

The FIGS. 9A and 9B show an arrangement in accordance with the invention which corresponds substantially to the arrangement of FIGS. 1 to 5 which is the reason the same reference numerals are used for the same components and the previous description also applies to the corresponding parts. Different with respect to the embodiment of FIGS. 1 to 5 is principally the design of the receiver 62 which now consists of two parts, namely a mirror 100 which is located before, at or behind the focal point of the parabolic mirror and a collector 102 which receives the radiation reflected by the mirror 100 and thus forms the actual receiver, which in the previous embodiment was arranged directly at the focal point of the parabolic mirror. The mirror 100 can however likewise be a parabolic mirror or a spherically curved mirror. One notes that, in this embodiment, the collector 102 is arranged at the rotational axis 32 of the base frame 14 so that it always has the same orientation to the mirror 100 and rotates with the base frame about the axis 32. This applies independently of the respective position of the parabolic mirror. The angular position of the mirror 100 must be correspondingly selected for this purpose or must be so automatically changed with the vertical steering to follow the sun that it is always the same point which is irradiated at the receiver. Moreover, the arrangement of the link arms 42 in FIGS. 9A and 9B is realized somewhat differently than in the FIGS. 1 to 5.

One can see from FIG. 9A a special advantage of this embodiment, namely both the mirror 62 and also the collector 102 are fully covered over by the downwardly pivoted parabolic mirror 10, i.e. protected.

It is particularly favorable when, in distinction to the representation of FIG. 9, the reflector 100 is arranged behind the focal point of the parabolic mirror, beneath the arms 58, since it then does not stand in the way of the rays falling on the parabolic mirror and the efficiency is thereby increased. The reflector must then adequately concentrate or distribute the rays coming from the parabolic mirror onto the collector. The receiver 62 can be arranged for the same reason with advantage behind the focal point beneath the arms 58, i.e. when a collector and no reflector is used. The receiver is then pivotally hinged with advantage to the arms and thus designed so that it is respectively pivoted inwardly and outwardly during the movement into the closed position (FIG. 5A) and out of this position, whereby a very compact arrangement results.

Figure 10A:
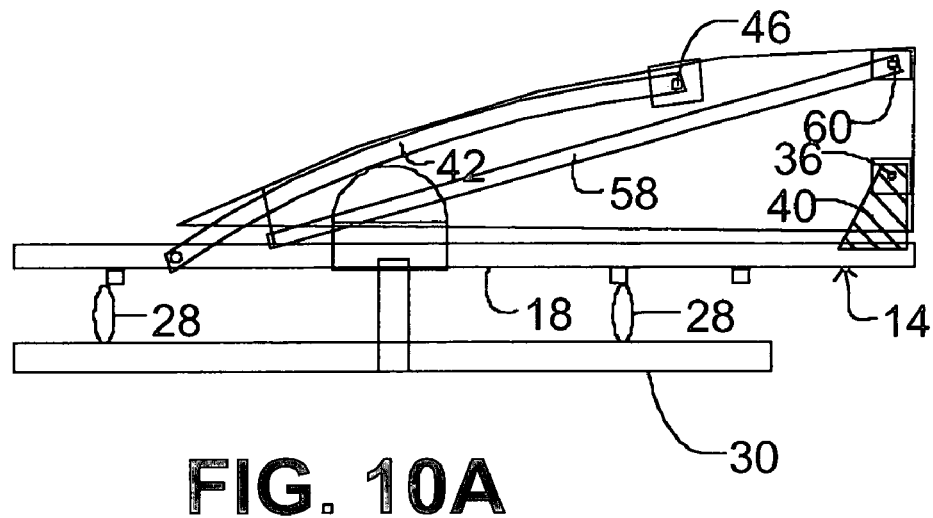
Figure 10B:
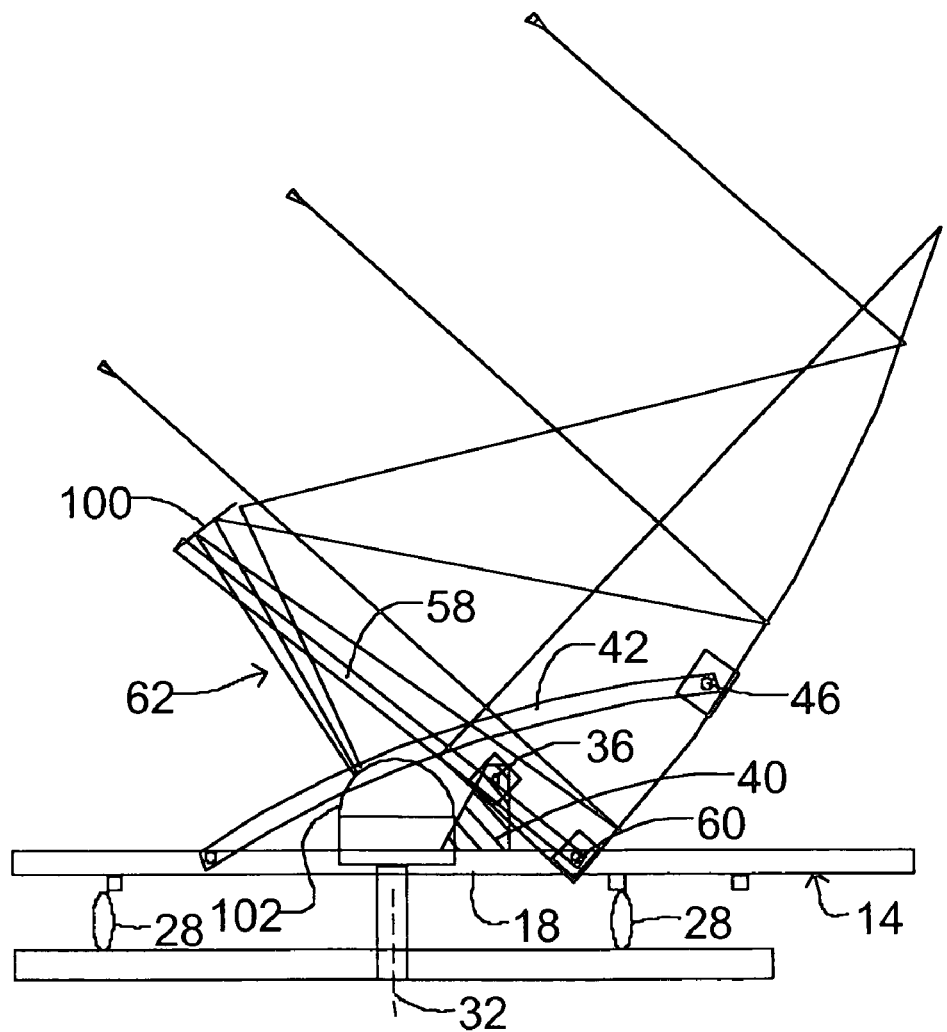

The FIGS. 10A and 10B show a further arrangement in accordance with the invention, which has a pronounced likeness to the arrangements of FIGS. 9A and 9B, but which is however realized in accordance with the specific design of FIG. 6, i.e. in this embodiment the link arms 42 are located within the parabolic mirror.

Since the receiver arrangement 62 in the embodiment of FIG. 10 is identical to that of the FIGS. 9A and 9B a further explanation is not necessary. Instead of this the description of FIGS. 9A and 9B applies for the embodiment of FIGS. 10A and 10B. The FIGS. 11A to 11J serve to explain the selection of the shape of the paraboloid.

With reference to FIG. 11A the basic principle of the parabolic mirror is first shown. Here ingoing parallel rays 108, i.e. the rays which come from the sun and which can be considered as parallel rays 108 because of the distance from the sun are always directed to the focal point 110 of the parabolic mirror 10.

FIG. 11B makes it clear that the central region of the parabolic mirror, i.e. at the place where the parallel light rays 108 are incident at least substantially perpendicular onto the surface 112 of the parabolic mirror 10 is a more effective region in comparison to an outer region 114 of the same dimension where the ingoing parallel rays 108 fall with a significant angle onto the surface of the mirror. Here a geometrically determined loss arises.

The quantity of energy in the two groups of light beams 108 is the same. For the rays 108 which fall onto the central region 112 of the parabolic mirror energy is received in a region which has a width of 30 units of any desired kind. For this, an area of the parabolic mirror is required which likewise extends over a width of approximately 30 units of any desired kind. For the parallel beams 108 which are incident at the bottom on the region 114 of the parabolic mirror, the corresponding region of the parabolic mirror must, however, have a width of approximately 41,80 units. In other words more reflector surface region 114 is required than in the region 112 in order to effectively reflect the same quantity of incident light. It is thus more economical to select a central region of the parabolic mirror for the purpose of the invention than a region which lies further outwardly, where the rays fall obliquely onto the mirror surface.

FIG. 11C shows for example how a parabolic mirror 10 with the shape which is shown in the previous Figures can be formed from the central region of the parabolic mirror of FIGS. 11A and 11B. It is particularly advantageous when the focal point 110 lies approximately in the horizontal plane 111 in FIG. 11C and is thereby aligned with the lower edge 12 and indeed because the receiver can then be arranged in a favorable position.

Figure 11G:
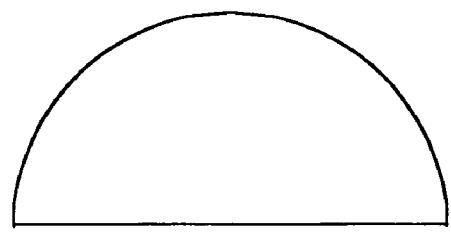
Figure 11H:
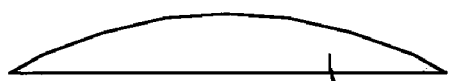
Figure 11:
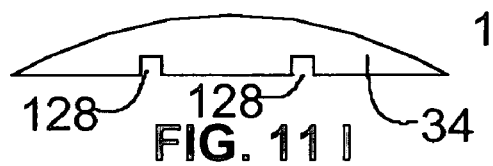

FIG. 11D makes it clear that the parabolic mirror does not necessarily have to be realized as a continuous paraboloid but rather that a plurality of segments, i.e. mirror facets 10A to 10I can be assembled together in order to produce an effective parabolic mirror. FIG. 11D moreover shows the use of a receiver 62 consisting of a mirror 100 and a collector 102 in accordance with the embodiments of FIGS. 9A and 9B and 10A, 10B respectively and also shows how, in this example, the reflector 100 can have a planar mirror surface and can moreover be arranged inside of the focal point 110 of the parabolic mirror realized by the segments 10A to 10E. This has the advantage that the dimension between the mirror 100 and the parabolic mirror 10A to 10I is shortened in comparison to the embodiments without mirror 100, where the receiver stands directly at the focal point 110, which is very expedient for the efficiency of the parabolic mirror and the compact arrangement of the components when the parabolic mirror is pivoted downwardly. FIG. 11E shows how one can form a parabolic mirror of approximately rectangular shape at the central region of a paraboloid of rotation. I.e. the two hatched and approximately D-shaped regions above and below the central region 112 are "cut away", i.e. actually never manufactured in the first place.

The chain-dotted line 118 points to a further possibility of subdividing the central region 112 into two halves A and B which can then respectively be exploited for the purpose of the invention and can indeed optionally also be arranged adjacent to one another.

Figure 11F:
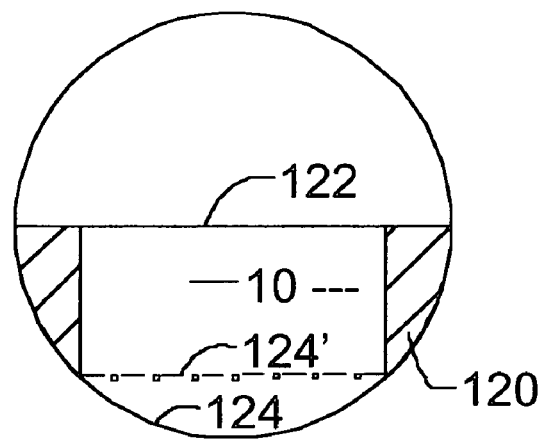
Figure 11E:
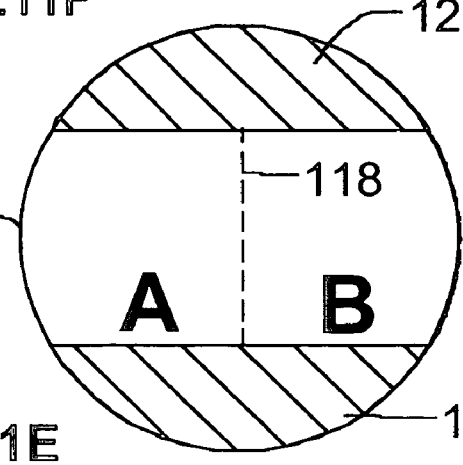

The FIG. 11F shows a further possibility of obtaining a parabolic mirror which is approximately rectangular in the plan view. Here the regions 120 provided with hatching are not used but rather only the non-hatched region 10 below the central line 122, with it being possible to cut the curved lower edge 124 of the parabolic mirror 10 in FIG. 11F differently if desired, for example in accordance with the chain dotted line 124'. The upper half of the parabolic mirror in accordance with FIG. 11F, i.e. the semicircular region above the central line 122 is normally also not realized but rather serves solely for representation as to how a parabolic mirror 10 can be selected with respect to a parabolic mirror with a circular periphery.

FIG. 11G shows however that the region above the line 122 can in principle also be considered as a parabolic mirror, with FIG. 11H showing a view in the arrow direction 126 which is filled out in practice with the support structure 34. The FIG. 11I shows how cut-outs 128 in the support structure 34 are possible, for example in order to arrange the parabolic mirror lower in comparison to FIG. 3 so that the beams 16 and 18 are also at least partly received in the cut-outs 128. Such cut-outs 128 can also be expedient in order to enable a pronounced pivotal movement of the parabolic mirror about the pivot axis 36 without this leading to contact between the parabolic mirror and the thrust blocks 40 or the beams 16, 18.

Finally the FIG. 11J shows how the relationships in respect to the curvature of the mirror can be most favorably selected.

In the selected embodiment r=400 cm and the depth T=r/4=100 cm. This ratio is important because it directly determines the ratio between the aperture (shadow on a vertical plane) and the mirror area. With a ratio of T=r/4 the mirror surface is only about 10% larger than the aperture. With very large mirrors a smaller ratio can be selected because of the improved statics of the self-supporting paraboloid.

In FIG. 11J f is the focal length of the parabolic mirror equal to the radius r of the parabolic mirror. This design is very advantageous because it ensures that the receiver 62 and optionally the link arms 42 are covered over in the downwardly pivoted state and that the curvature of the entire middle region is not too great.

The FIGS. 12A to 12D show how the parabolic mirror can be assembled from individual elements or segments. Here we initially start from a semi-circular design of a parabolic mirror in plan view. It will however be understood that the outer outline of a parabolic mirror can actually be selected as desired, for example in accordance with the different embodiments of the FIGS. 11I, 11F and 11G.

Figure 12A:
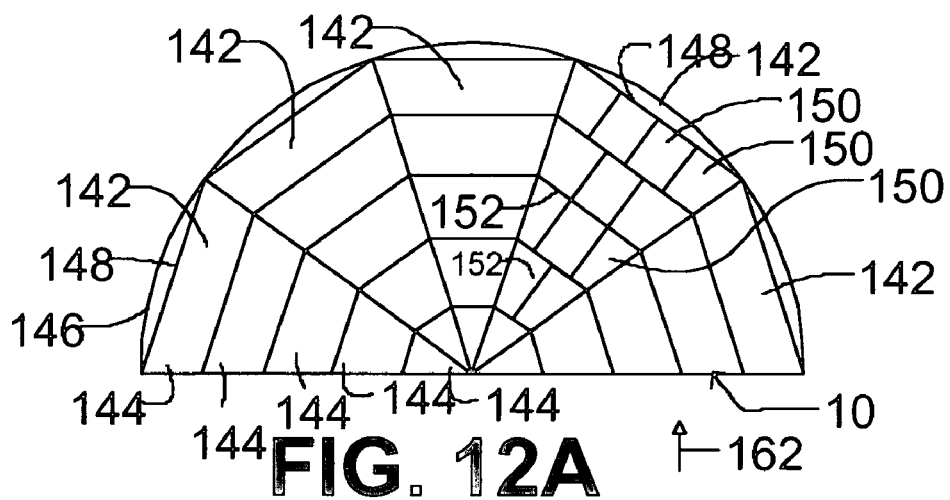

FIG. 12A shows first of all that the parabolic mirror 10 can be assembled from five sector-shaped regions 142 "large segments" arranged alongside one another. In this arrangement each segment 142 can consist of one piece or it can, for example, itself be assembled from five individual pieces 144 as is shown for the lowermost segment at the left hand side of FIG. 11A. In this arrangement the left hand edge of the segment 140 at the left hand side can be selected so that it is either curved, as it is indicated in 146 or straight, as shown at 148. The individual pieces 144 can also be further subdivided and can be assembled from the differently shaped segments 150 which are shown at the right hand side of the FIG. 12A. Other subdivisions are also possible, as is indicated by the lines 152 drawn in by way of example.

Figure 12B:
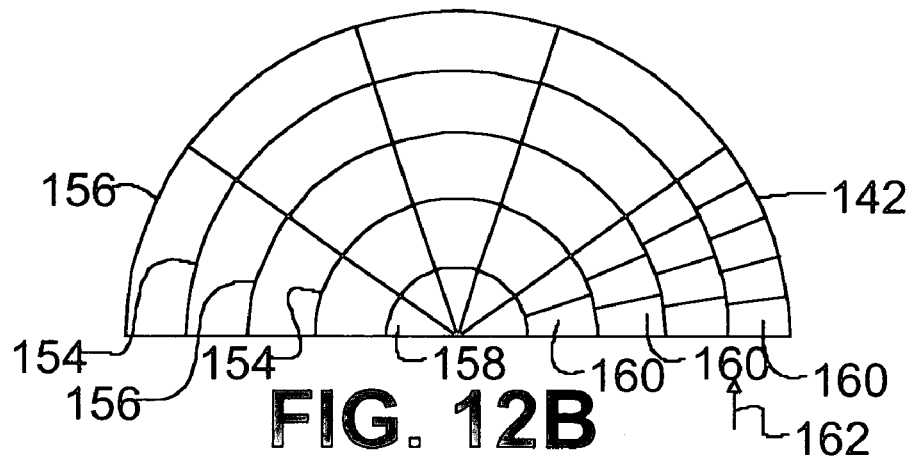

It should be brought to expression that the parabolic mirrors which are used for the invention can be manufactured in large dimensions, for example can be straightforwardly manufactured with a transverse dimension of more than 8 m. Such structures are relatively difficult to transport, particularly since they are relatively light and could be easily be damaged by elevated airspeeds during travel if they are not secured in an orderly manner to the transport vehicle. In accordance with the invention it is thus preferred to manufacture the parabolic mirror from individual segments which can then be secured to one another at the site of installation of the parabolic mirror as will be explained in more detail later. FIG. 12B shows that individual pieces of the sectors do not necessarily have to be executed with straight edges, but rather could each have two curved edges such as 154 and 156. Naturally this does not apply to the sector-shaped segments 158 in the central region of the parabolic mirror. The individual segments within one ring are the same.

FIG. 12B also shows a further possible subdivision of an individual sector so that this consists of a plurality of like pieces 160, with not all pieces 160 necessarily being the same but such that a sector 142 can be assembled from a few segments 160.

Figure 12C:
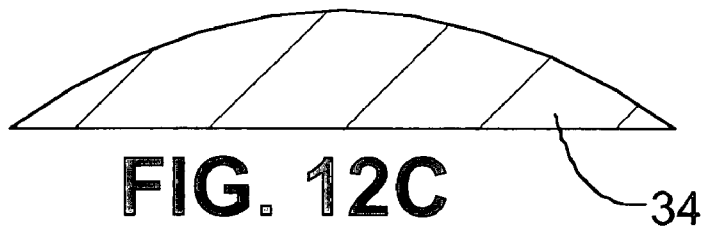

FIG. 12C shows the shape of the support structure 34 which can be used with a parabolic mirror in accordance with FIGS. 12A and 12B respectively, in each case seen in the direction of the arrow 162 in FIGS. 12A and 12B respectively.

Figure 12D:
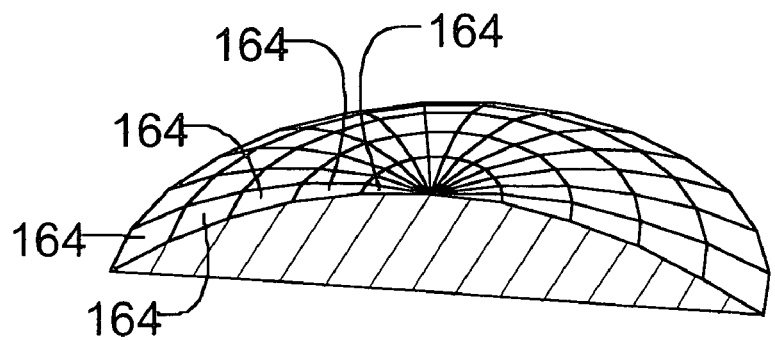

Finally FIG. 12D shows a schematic respective illustration of a parabolic mirror similar to FIG. 12B from which it is evident that the mirror surface can be assembled from a plurality of segments 164 of which there are as many types as the number of rings, i.e. in this example five types.

As a material for the segments a polystyrene extruder foam of higher density is preferably used which is provided at the reflecting side with a reflecting foil, for example an aluminium foil.

An example for a segment of this kind, for example 152 in accordance with FIG. 12A, but also representative for the other sectors and segments 142, 144, 160, 164 of FIGS. 12A–D is shown in FIG. 13. One notes that the segment 152 is provided at all sides with a rounded groove 170 which is part-circular in shape and extends over somewhat more than a semi-circle. Such grooves can for example be cut out from the individual segment 152 with a minimum loss of material through the use of a heated wire which is likewise shown in part-circular shape. Parts 172 which are approximately D-shaped in cross-section arise. The possibility then exists of adhesively bonding two such parts to one another and indeed at the point 174 which is shown in FIG. 13D. The structure 177 of FIG. 13D can be provided with an external skin 175 of a fibre-reinforced synthetic resin. This skin 175 serves, on the one hand, for the reinforcement of the connection element and compensates, on the other hand, for the cutting width during the cutting out of the two D-shaped parts.

The structure of FIG. 13D with the cross-section in the shape of an 8 can then be reused in order to bond two segments together. This takes care of a form-fitted connection of two segments to one another since the dimension in the region of the arrows AA is greater than the dimension in the region of the arrows BB which corresponds to the dimension at the entry inlet 176 to the grooves 170. Each segment 152 can be provided in accordance with FIG. 13F with a structure 177 in accordance with FIG. 13D at two sides, so that the segments can be directly plugged together in accordance with a tongue and groove construction, such as is usual with floorboards.

This part can also serve—as shown in FIGS. 13E to 13H—to secure a segment 152 to a rib part 180 which projects in a radial direction beyond the mirror surface (mirror foil) 171 of the parabolic mirror and serves to stiffen the structure, i.e. the parabolic mirror.

After adhesive bonding of a plurality of segments 160 to one another (optionally) using rib parts 180, a fibre reinforcement 181 is then laid over the entire rear side of the mirror, for example in the form of glass fibres which are impregnated with a corresponding resin so that a water-tight stiff shell arises. This shell is stiffened on the one hand by the foam parts of the segment 152 and optionally by the stiffening ribs 180, which likewise consist of foam material or wood or of other material and which ensure that the segments themselves do not deform so that the characteristics of the parabolic mirror are always ensured. Bolts 183 can be used in order to secure the segments with the reinforcing ribs firmly against one another during the curing of the synthetic resin. They can optionally also contribute to the strength of the finished structure or they can be removed again after the segments have stuck together (through the adhesive bond).

If desired, stiffening ribs 180 can be provided at the rear side of the parabolic mirror instead of at the front side of the parabolic mirror 10—or both at the rear side and also at the inner side. There is no loss in effective surface since the surfaces of the stiffeners can be added to the mirror surface. The mirror is thus simply made slightly larger, can however help on the whole to stiffen the mirror so that it can be made even larger and its effective surface can be enlarged in this manner.

The production of a shell of the composite material, for example of glass fibres impregnated with resin also makes it possible to attach the hinge lugs 38, 88 and 90 of the parabolic mirror. These lugs can namely likewise be realized as fibre reinforced composite materials, optionally with embedded sleeves or metal or wood stiffeners in order to secure the pivot axles to the parabolic mirror with sufficient strength. Wood also sucks itself full of synthetic resin and becomes particularly strong. A construction of this kind is light.

The support structure 34 can consist of composite materials and can likewise be bonded to the parabolic mirror by using such fibre reinforced layers.

Figure 14:
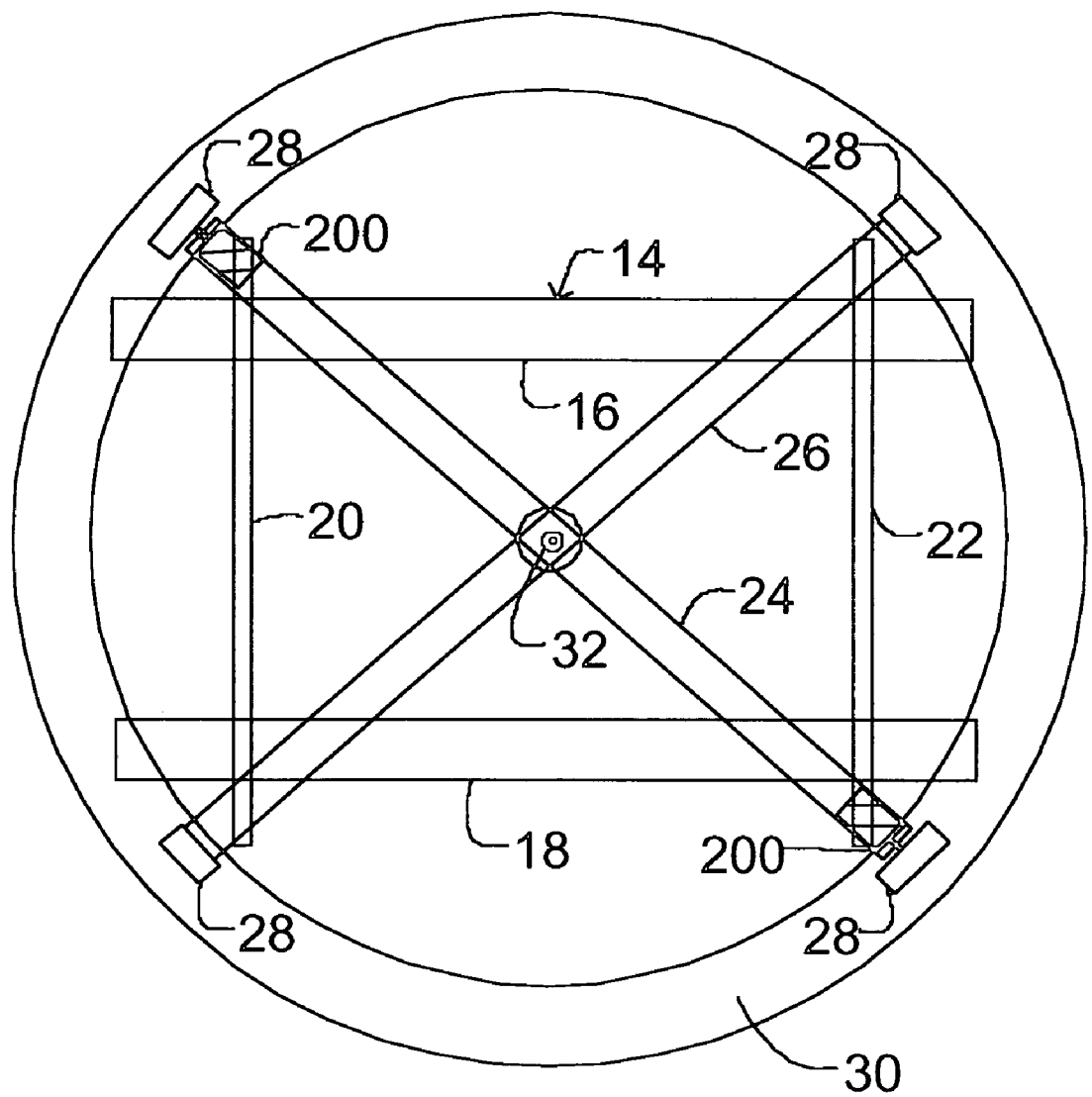

FIG. 14 shows a first possibility for realising the rotational drive of the parabolic mirror, i.e. for the horizontal steering about the vertical axis 32. The representation of FIG. 14 corresponds essentially to the representation of FIG. 1, however, the parabolic mirror and the associated link arms have been omitted for the sake of the illustration. In other respects the base frame 14 is also designed differently and indeed in order to provide space for the attachment of motors 200, which drive two wheels 28 directly or via transmissions. Although two motors 200 are shown here it would also be conceivable to operate with only one motor 200. Also all wheels 28 can be driven. One notes that the two wheels 28 which are directly driven by the motors 200 are somewhat larger in diameter than the two other wheels 28. The reason for this is that one wants to ensure that the larger wheels 28 always have a driving contact with the guide track 30. The other two wheels simply serve for stability and achieve their own contact with the guide track 30 as a result of the large dimensions of the base frame 14 by a light bending of the same, however, the contact forces of the larger wheels should be higher. Driven wheels of the same size could also be lowered somewhat.

FIG. 15 shows a schematic representation of a possible arrangement for the displacement of the thrust blocks 40 in order to achieve the vertical steering of the parabolic mirror. In this embodiment a threaded rod 222 is used which is driven by a motor 224 to execute a rotary movement. The rotary movement of the threaded rod 222 is transmitted via a nut element 226 to the driven thrust block 40 so that the latter, which is movably mounted on four rollers 228, can move along the respective beam 16 or 18 in both directions. To achieve the movement in both directions, the motor 224 is a reversible motor.

The cross-sectional drawing of FIG. 15B allows it to be seen how the rollers 228 are journalled on stub axles 230, which project into respective C-shaped spaces to the left and right of the central web 232 of the respective beam 16 or 18, which is realized as an I-beam, with the rollers 228 running on the lower cord of the beam.

Figure 15C:
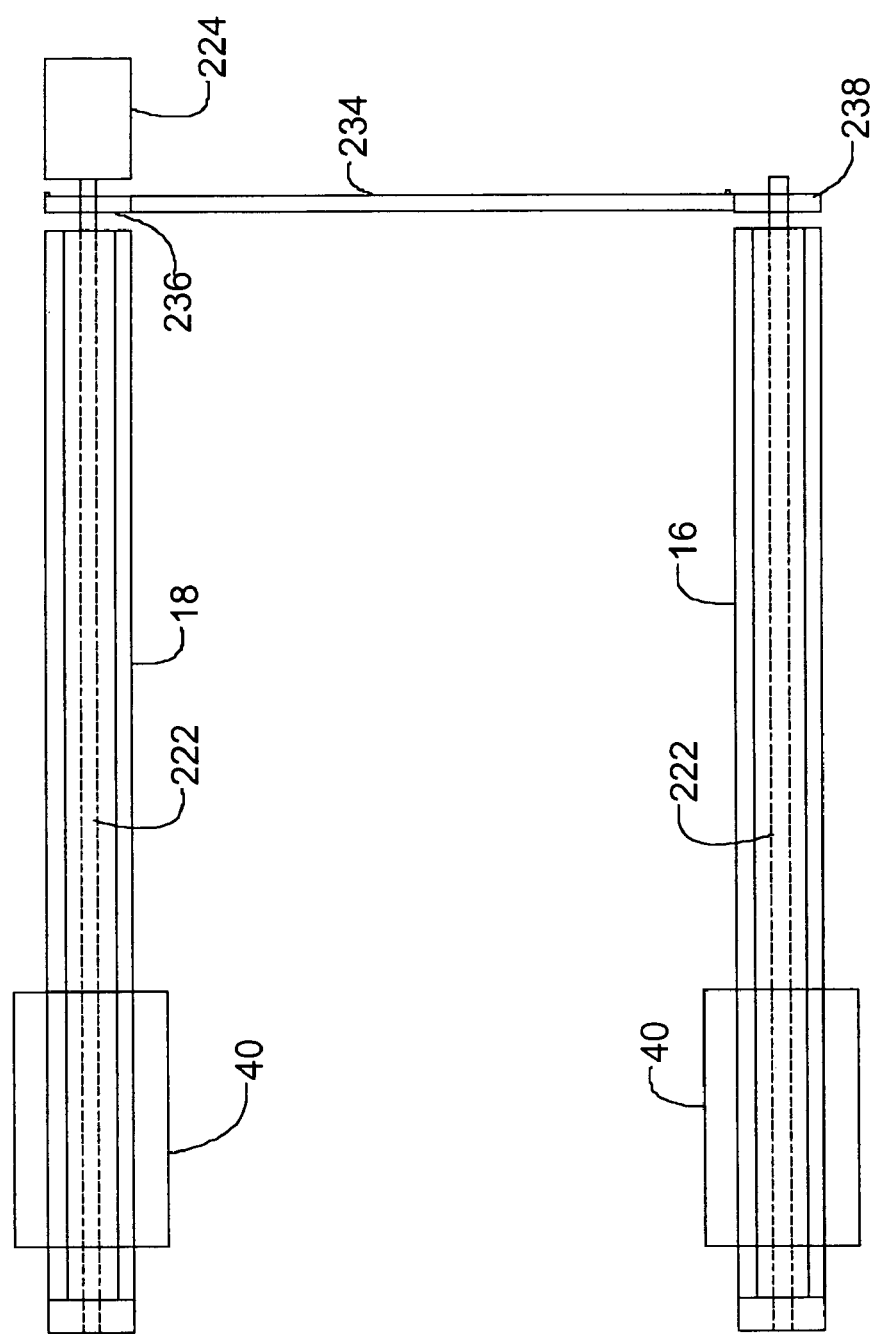

In order to ensure the synchronisation of the two thrust blocks 40 at favorable cost and to make do with only one motor 224, the one threaded spindle 222 is directly driven by the motor 224 in accordance with FIG. 15C—i.e. the threaded spindle 222 which is associated in FIG. 15C with the beam 18—whereas the spindle 222 associated with the beam 16 is driven via a chain 234 synchronously with the directly driven spindle 222. For this purpose the chain 234 runs around two chain sprockets 236, 238 of the same size, with the chain sprocket 236 at the spindle 222 being rotationally fixedly connected to the output shaft of the motor 224 or to the corresponding threaded spindle 222. The chain sprocket 238 is rotationally fixedly connected to the lower threaded spindle 222 in FIG. 15C.

Finally, FIG. 16 shows an alternative possibility for synchronously driving the two thrust blocks 40 from one motor 224. Here the thrust blocks 40 are displaceably journalled, as in the embodiment of FIG. 15C, on respective beams 18 and 16 by rollers. The details of this mounting correspond to those of FIG. 15 and are not shown further here. The motor 224 drives a worm 240 which meshes with two worm wheels 242 which in turn displace respective cable pulls 244. The cable pulls are connected at respective points of attachment 246 to one of the thrust blocks 40 and have a respective tensioning spring 48 for length compensation and to ensure the required cable tension. Each cable pull 244 runs around a plurality of deflection rollers 250 which are schematically shown in FIG. 16.

Although the representation of FIG. 16 creates the impression as if the cable pulls 244 would run around the respective worm wheels 242, the cable pulls actually run around cylinders which lie below or above the worm wheels. Although it would be conceivable that one could generate an adequate driving force if the cable pulls only extend around half the periphery of the cylinder it is probably more favorable for the cable pulls to have several turns around the driving cylinder. This admittedly has the disadvantage that the cable pulls are then shifted in the axial direction of the cylinder on rotation of the cylinder, since they are, for example, wound off from the top and wound on at the bottom, this change in length can, however, be compensated for by the tensioning spring 428.

It is particularly advantageous in the arrangement of FIG. 16 that this is a very favorably priced solution, not only because cable pulls are available at relatively favorable prices, but rather also because the use of a worm wheel transmission consisting of the worm 240 and the worm wheels 242 enables a step-down ratio, so that one can operate with a relatively small high-speed and favorably priced motor 224 and the drive system is self-holding, i.e. a separate brake is necessary.

It should also be brought to expression that the outer periphery of the parabolic mirror can in no way only be realized in semi-circular shape. The parabolic mirror can, for example, have a rectangular shape in plan view or a rectangular shape with rounded corners, with the rounded corners preferably being the two corners which lie remote from the lower edge of the parabolic mirror in operation. Although, in some of the examples shown here, the lower edge appears to be straight in plan view, since one cannot see the curvature given by the parabolic shape in this direction of viewing, it is also conceivable to give the lower edge a slightly curved shape.

A parabolic mirror which is of circular round shape in plan view can also be used for the purpose of the invention. This can, in particular, be of advantage when, for example, the parabolic mirror is to be used on an approximately circular swimming pool in plan view or on a house which appears approximately circular in plan view or when it is intended to cover over a circular region of a swimming pool or of a house.

With such an arrangement the hinge axis 46 is arranged at a position on the parabolic mirror which corresponds, so to say, to a horizontal diameter of the parabolic mirror and indeed either at the front side or at the rear side in accordance with the embodiment of FIG. 5 or 6. The pivot axis 36 is then located in the region of the lower edge of the parabolic mirror in the upwardly pivoted position, preferably somewhat above this lower edge. Here, the particular advantage of the invention comes into effect that the pivotal movement of the parabolic mirror is achieved so to say by the mutual displacement of the pivot axes 46 and 36 towards one another or away from one another.

The center of gravity of the mirror thereby always remains approximately above the center of support frame 14.

In the further description with respect to the FIGS. 17 to 22 some preferred variants of the invention are described and the same reference numerals are used as previously for the same part in order to avoid unnecessary repetition of the description of the corresponding parts. That is to say, the previous description also applies here for parts which have the same reference numerals unless something to the contrary is expressed. If new features are described, then these will be provided with new reference numerals.

Figure 5A:
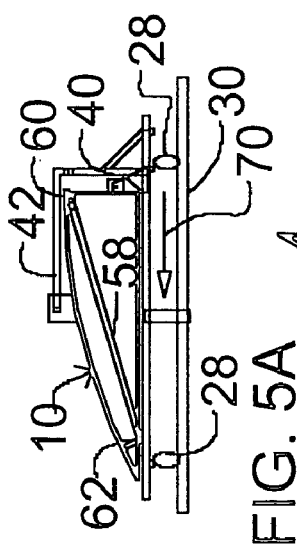
Figure 5D:
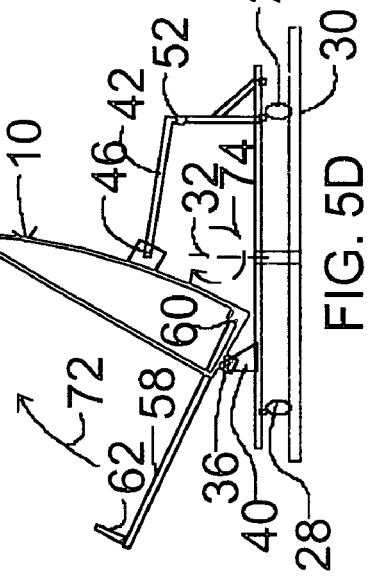
Figure 17:
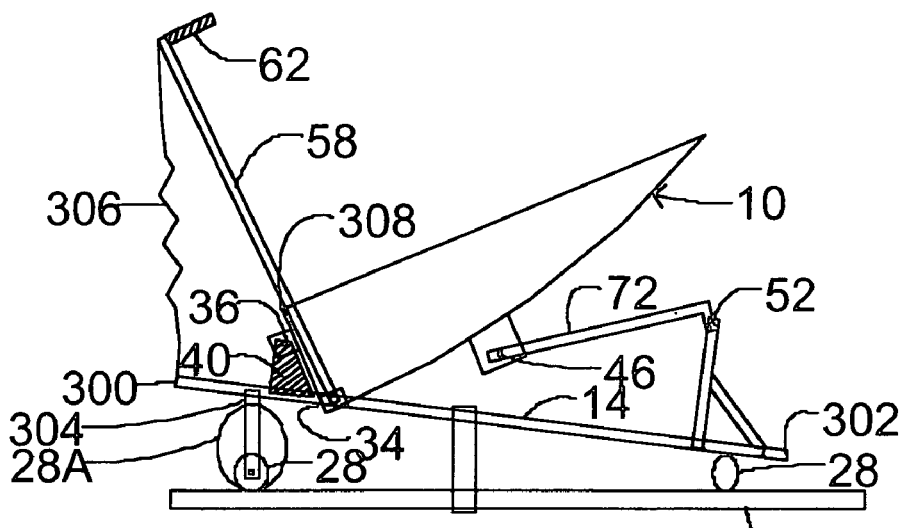

The FIG. 17 corresponds at least substantially to the representation of FIG. 5E, however, with the exception that the base frame 14 is raised at the front end 300, i.e. in the region of the pivot axis 36 in the upwardly pivoted state of the parabolic mirror 10 in relationship to the rear end 302, i.e. in relationship to the region where the pivot axle 36 comes to lie in the downwardly pivoted state of the parabolic mirror. In this way, the maximum pivotal movement which has to be brought about by the positioning drive between the fully downwardly pivoted state parallel to the base frame 14 and the fully upwardly pivoted state in accordance with FIG. 17 is reduced in comparison to the embodiment of FIG. 5, whereby the design of the positioning drive is positively influenced. This is particularly important when the sun is high in the sky—in particular at the equator—since the parabolic mirror has to adopt a horizontal or almost horizontal position when swung upwardly.

One possibly of achieving this inclined position of the base frame 14 lies in attaching the front wheel 28 to legs at 304 which extend downwardly from the base frame 14. Another possibility would be to provide the front wheels 28 with a larger diameter, such as is schematically illustrated at 28A. I.e. the base frame 14 is raised by a suitable substructure at the front in this example, i.e. at the side at which the upper edge of the parabolic mirror comes to lie in the downwardly pivoted state, for example by the vertical beam or leg 304, which can be braced for higher stability.

FIG. 17 also shows a rubber cable 306 which can be tensioned between the front end 300 of the base frame 14 and the receiver 62. The cable tension generates in the upwardly pivoted state of the parabolic mirror 10 in accordance with FIG. 17 a torque about the pivot axis 36 which aids the positioning drive during the downward pivoting of the parabolic mirror to overcome the torque produced as a result of the action of gravity.

In similar manner, a rubber cable (not shown) can be tensioned between the front end 300 of the base frame and the lower edge 308 of the support structure 34 in the downwardly pivoted state of the parabolic mirror and assists the positioning drive during the upward pivotal movement of the parabolic mirror out of the downwardly pivoted state. In the upwardly pivoted state this rubber cable is then slack.

Figure 18A:
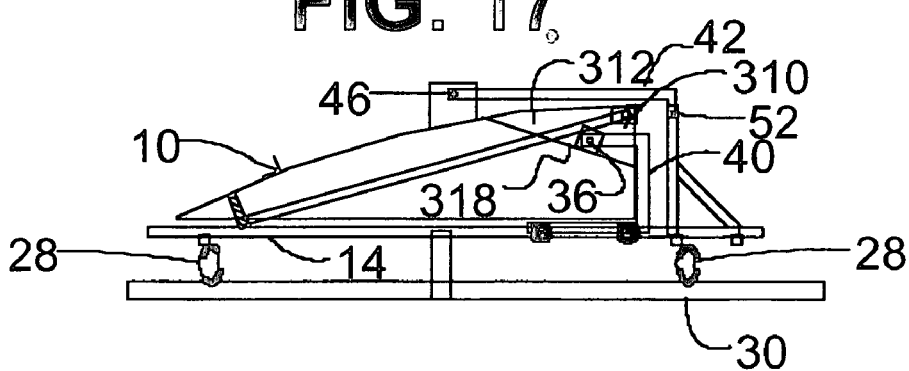
Figure 19A:
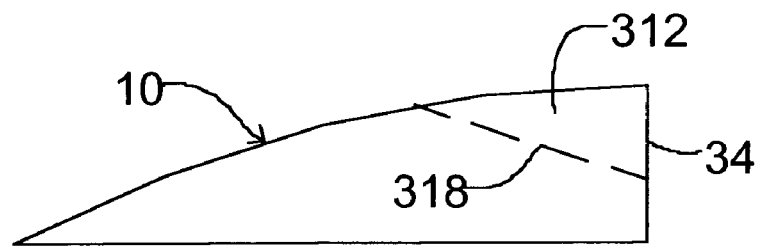
Figure 19B:
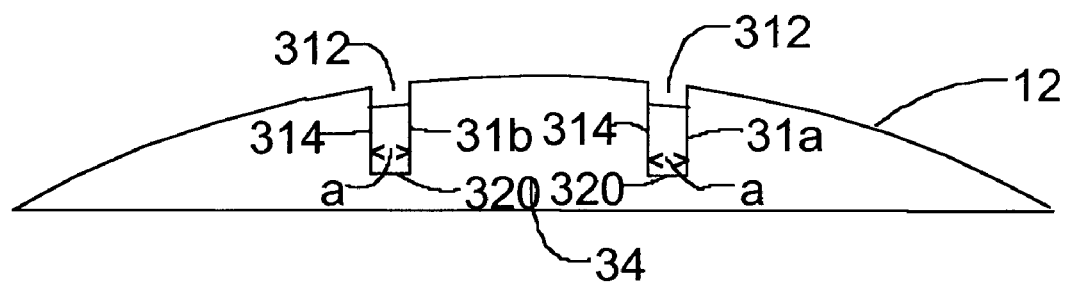

FIG. 18A corresponds approximately to the representation of FIG. 5A, but in this embodiment the pivot axle 36 is attached to an upper support frame 310 of the thrust block 40, and indeed at a position which is arranged in a cut-out 312 of the parabolic mirror. This cut-out 312, which is also shown in FIGS. 19A and 19B and of which there are two in this example (one cut-out for each thrust block 40) are respectively formed by two walls 314, 316 which have the shape of a right-angled triangle in side view and which have a spacing "a" from one another. Of each side wall, one side is fixedly connected to the parabolic mirror 10, whereas the second side, which forms at least substantially a right angle with the first side, is connected to the support structure 34. The two hypotenuses 318 of the wall 314, 316 are connected together at 320 in order to achieve a stiff design of the parabolic mirror. That is to say, each cut-out 312 extends from the point of intersection of the curvature of the parabolic mirror 10 with the support structure 34 to an imaginary line between the pivot axes 36 and 46 or to an imaginary line parallel thereto. This triangular cut-out can, for example, consist of wood or can be lined or formed and reinforced with another solid material.

Figure 18B:
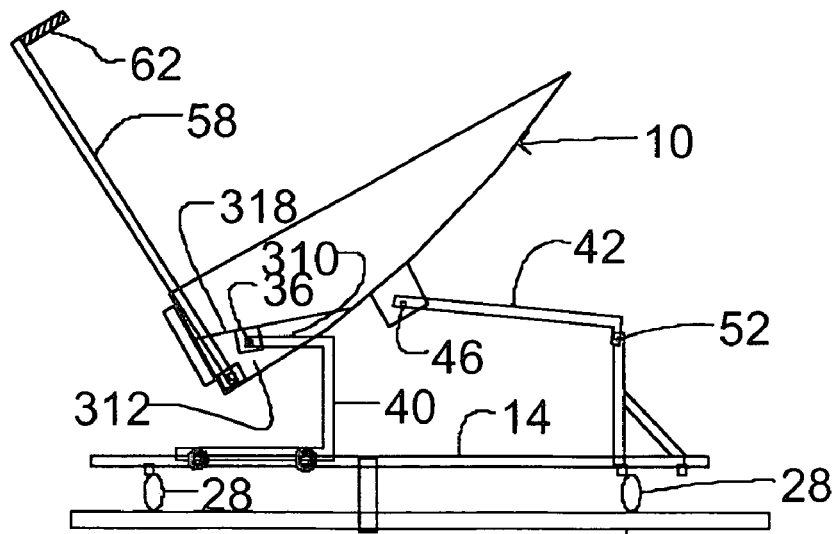

Apart from the desired stiffening and reinforcement of the parabolic mirror the cut-out 312 make it possible to place the pivot axis 52 lower, since the cut-out can accommodate the link arm 42, which is however not shown. In other respects, as a result of the cut-out, the parabolic mirror 10 can also be pivoted further towards the rear in the upwardly pivoted state, since the upper support arm 310 of the thrust block comes to lie in the cut-out, as shown in FIG. 18B. One notes that the thrust blocks 40 which come into use here are U-shaped in side view, with the limbs of the U-shape lying horizontally and with the lower limb carrying the rollers for the linear displacement of the thrust blocks 40 and the upper limb forming the support arm 310.

Figure 19C:
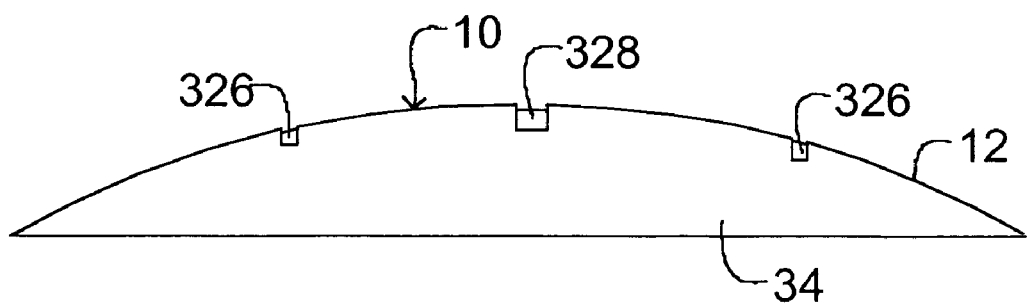

FIG. 19C shows that the parabolic mirror 10 can be notched at all points where its lower edge 12 could strike in the upwardly pivoted state against the base frame 14 or against other parts such as the positioning drive, i.e. it can be provided with cut-outs such as is shown at 326 and 328 in order to avoid such striking.

The FIG. 20A shows how a plurality of thrust blocks 40 (here two thrust blocks) can be driven with a number of positioning drives 224 (here one positioning drive) which differs from the number of thrust blocks. The two thrust blocks are namely firmly connected together, for example by means of a board or a bar to form an assembly and the positioning drive 224 then engages at the assembly such that the positioning forces are uniformly distributed onto the two thrust blocks. In order to achieve this in this example with one positioning drive 224, the latter engages at the bar 322 at its center. The positioning drive 224 is preferably realized as a garage door drive.

The section B—B shows how each of the thrust blocks 40 with two roller pairs 324 is linearly movably mounted on the lateral frame parts 326 of the base frame 14.

The solution proposed for the first time in this application for the vertical following of the sun could be termed, using the specialist language of mechanical engineering "an interlinked transmission with a thrust crank and three joints" with the thrust crank being driven by a positioning drive. It is favorable to use a linear drive because the movement of the thrust crank is linear. For this purpose a commercially available and particularly favorably priced garage door drive can be used, as already mentioned.

FIG. 21 shows an arrangement in accordance with FIG. 15C but with additional parts in the form of the rubber cables 330. Each rubber cable is secured at one end 332 to the thrust block 40 or (which is not shown) to a structure which connects a plurality of thrust blocks 40. The second end 334 of the rubber cable is preferably secured to the base frame 14 at the middle of the path of travel of the thrust blocks. For improved metering of the spring forces or the rubber tension forces a plurality of springs or rubber cables such as 330 can be used the second ends of which are each secured to the base frame 14 at different positions along the path of travel of the thrust blocks. Basically an arrangement of this kind can be used with only one thrust block 40 or with a plurality of thrust blocks 40. At least one rubber cable 330 is then preferably provided for each thrust block.

Figures 22A, 22B, 22C:
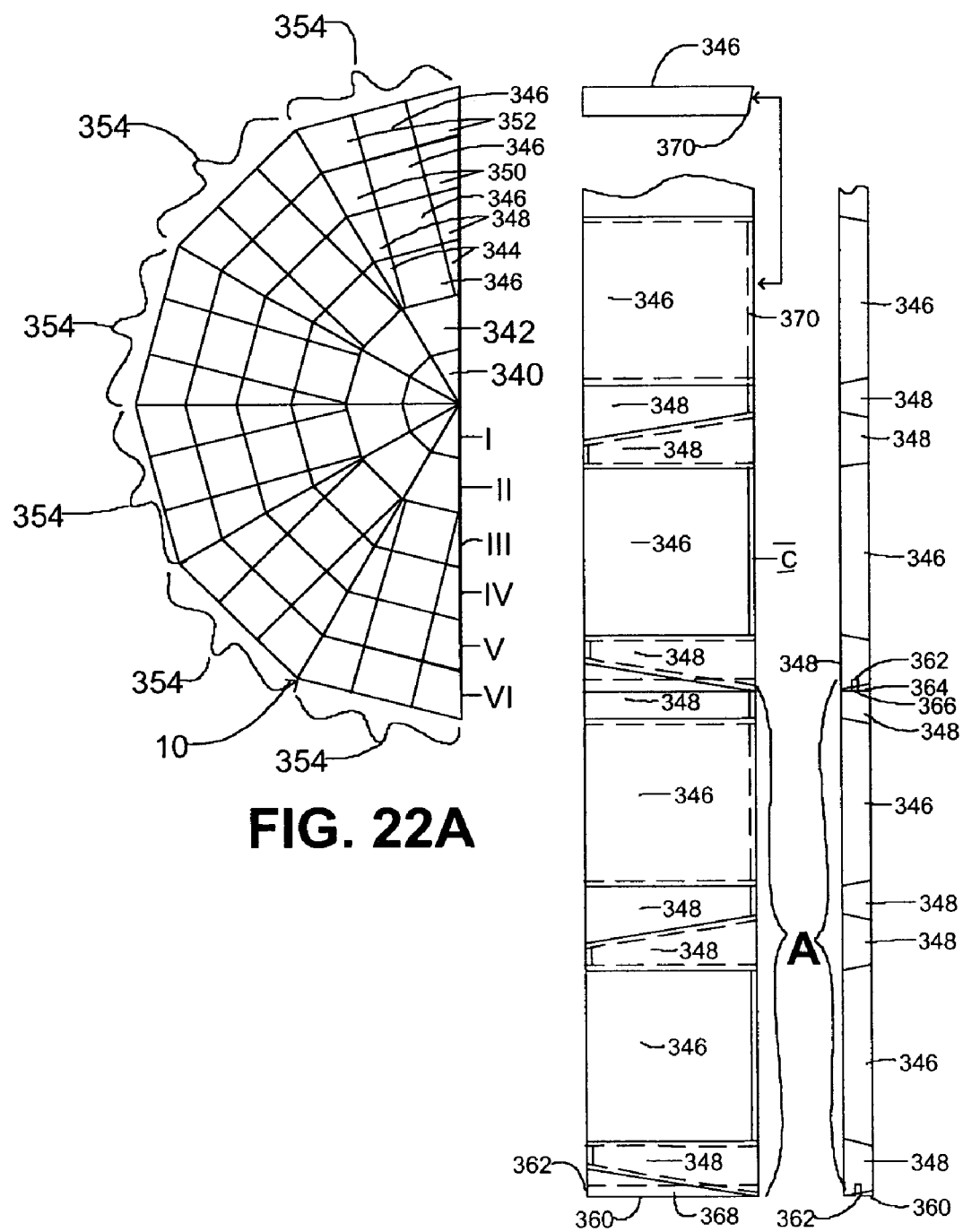

FIG. 22A shows a parabolic mirror 10 in accordance with the invention which is assembled from individual flat, non-curved elements. The parabolic mirror 01 in accordance with FIG. 22A consists in this example of 6 concentric rings I, II, III, IV, V, VI. The ring I is composed of six segments 340 which are triangular in plan view. The ring II is composed of six segments 342 which are trapezoidal in the plan view. The ring II is composed of segments 344 which are trapezoidal in plan view and of square segments 346, with the trapezoidal segments 344 being very short at their inner end and optionally being capable of being replaced by triangular segments. The ring III consists in turn of elements 348 which are trapezoidal in plan view and square elements 346. The ring V consists in turn of elements 350 which are trapezoidal in plan view and of square elements 346 and this also applies to the ring VI which consists of elements 352 which are trapezoidal in plan view and square elements 346.

The sides of the individual segments are so chamfered, that the flat surfaces are so orientated in the parabolic mirror that a good approximation to the desired parabolic shape results. The individual elements are bonded to one another in the region of their sides for the formation of the segments and the individual triangular segments 354 are likewise bonded in the region of the long sides to the adjacent triangular segments 354 for the formation of the parabolic mirror. The total structure is clad in accordance with FIG. 13, at least at the rear side, with glass fibre reinforced plastic, as shown in FIG. 13H, and the required cut-outs can be provided in the parabolic mirror which are described in connection with other figures. It will now be shown with reference to the FIGS. 22B and 22C how the construction of FIG. 22A can be produced at least substantially free of cutting waste from extruder foam boards, such as A and indeed here with reference to the elements 348 and 346 of the ring IV, with the explanation given here applying in just the same way for the elements of the other rings.

A commercially available extruder foam board A, such as is suitable for the present invention can for example be obtained from the manufacturing companies in dimensions of approximately 60 cm width×240 cm length×4 cm thickness. Such extruder foam boards are frequently provided with tongue and groove connections at their narrow sides, with the lower narrow side 360 in FIGS. 22B and 22C being provided with a groove 362 and the upper narrow side 364 in FIGS. 22B and 22C being provided with a tongue 366 which is inserted into the corresponding groove 362 in the next following board. It is sufficient to simply plug the extruder foam boards together, an adhesively bonded connection can be optionally provided in the region of the tongue and groove connection. In this manner an elongate structure arises as shown in FIGS. 22B and 22C, this structure being assembled from individual boards, which is only indicated with respect to the example of the lower boards in order to not unnecessarily complicate the representation.

Instead of forming the length of boards from a plurality of individual boards such as A take it also be utilized as a continuous web from the foam material extruder, which web is to be subdivided into individual segments immediately after the extruder.

The lower triangular region 368, which is shown hatched in FIG. 22B, can be understood as cutting waste. Thereafter the following elements are cut-out from the material web formed by the boards in the sequence from the bottom to the top: 348, 346, 348, 348, 346, 348, 348, 346, 348, 348, 346 etc. In the region of the tongue and groove connection 362, 366 between two extruder foam boards there arises at least substantially no cutting waste. That is to say the hatched region 368 only arises at the start of the first board.

One notes from the double lines in the edge region of the individual elements, as shown at 370, that the elements are chamfered here. This applies for all regions which are drawn with a double line, with the degree of the angling having to be selected in accordance with the respective ring. In some chamfered regions a certain cutting waste can arise, it is, however, minimal.

The broken lines show edges which are formed at the lower side of the board web in accordance with FIG. 22B.

Although the representation in accordance with FIGS. 22B and 22C only applies for the ring IV one understands that the corresponding cutting scheme applies for the elements of the other rings. The cutting waste, which is minimal, can also be melted down again so that one can operate loss-free in total.

It is particularly favorable that some of the straight cuts, in particular those which extend transversely or obliquely to the respective material board, i.e. to the material web, simultaneously form the chamfered, i.e. inclined sides of two elements, whereby on the one hand material losses are minimized and on the other hand the cutting process can be carried out economically. The chamfer angle of chamfered sides of the elements is in each case so designed that on putting the elements together the approximated parabolic shape arises. I.e. the sides of the elements of each ring which extend approximately radially have the same oblique angle but the other sides of the individual elements of different rings extending around the axis of rotational symmetry have to be differently selected depending on the position of the ring within the parabolic shape in order to provide the desired approximated parabolic shape.

Although the parabolic mirror construction which is disclosed here is principally used for solar mirrors, the construction can also be used for other purposes, such as radar systems or satellite reception.

What is claimed is:

1. A concentrating solar energy system with a reflector having a specularly reflecting inner side and realized as a parabolic mirror with two axis steering which is carried by a base frame arranged in a support plane and which is provided with a receiver arranged in operation at, in front of or after the focal point of the parabolic mirror, with the parabolic mirror moreover being rotatable about an axis which stands at least substantially perpendicular to the support plane, said solar energy system comprising the parabolic mirror being pivotable upwardly and downwardly about a pivot axis arranged in at least one of the region of the support plane and at a distance above or below the support plane, with the pivot axis being displaceably arranged in at least one of a plane parallel to the support plane and in the support plane and with the displacement of the pivot axis contributing to the corresponding pivotal movement of the parabolic mirror wherein the pivotal movement of the parabolic mirror is assisted by at least one link arm which is hinged at one end in the middle region of the parabolic mirror and at the other end to the base frame and wherein the parabolic mirror is downwardly pivotable about the pivot axis to such an extent that it forms a roof in the downwardly pivoted state with said specularly reflecting inner side facing downwardly.

2. The concentrating solar energy system in accordance with claim 1, said pivot axis and said link arm being adapted to enable said downward pivoting to form a roof and upward pivoting to follow the sun.

3. The concentrating solar energy system in accordance with claim 1, wherein the parabolic mirror lies in the downwardly pivoted state on a support surface, a foundation, a ground base or a wall matched to the outline of the parabolic mirror and is latchable thereto.

4. The concentrating solar energy system in accordance with claim 1, wherein an elongate support structure extends along the lower edge of the parabolic mirror and also carries the pivot axle.

5. The concentrating solar energy system in accordance with claim 1 and further comprising a carrier arm for said receiver, said parabolic mirror having a first hinge point for attachment to a thrust block, a second hinge point for attachment to said at least one link arm and a third hinge point for the attachment of said carrier arm, there being a triangular brace provided within said parabolic mirror and having first, second and third apices respectively positioned adjacent to said first, second and third hinge points.

6. The concentrating solar energy system in accordance with claim 1, wherein the base frame is rotatable by means of rollers or wheels on a circular track to realize the rotational of movement about the vertical axis.

7. The concentrating solar energy system in accordance with claim 1, wherein for the realisation of the pivotal movement the parabolic mirror is connected to the base frame via a link arrangement and the pivot axis is movable over the base frame, in that the link arrangement consists of at least one link arm which is pivotally connected at one end in the central region of the parabolic mirror to its rear side and at the other end to a support point which is carried by the base frame and is arranged behind the parabolic mirror.

8. The concentrating solar energy system in accordance with claim 1, wherein the link arrangement comprises at least one link arm which is pivotally hinged at one end in the central region of the parabolic mirror to its reflecting inner side and the other end to a support point which is carried by the base frame and which is located in the downwardly pivoted state of the parabolic mirror adjacent to the position which is adopted by the edge of the parabolic mirror forming the upper edge in the upwardly pivoted state.

9. The concentrating solar energy system in accordance with claim 1, wherein a positioning drive driven by a drive motor is provided for the movement of the pivot axis on the base frame.

10. The concentrating solar energy system in accordance with claim 9, wherein the positioning drive is a threaded spindle which is rotatably journaled at the base frame, which engages into a corresponding thread or into a corresponding threaded nut in a thrust block which belongs to the structure carrying the pivot axle.

11. The concentrating solar energy system in accordance with claim 9, wherein the positioning drive is a chain drive, the chain of which runs around two chain sprockets rotatably journalled on the base frame and which is secured at a position in the region of the pivot axis to the parabolic mirror or to an associated thrust block.

12. The concentrating solar energy system in accordance with claim 9, wherein the positioning drive is a rack and pinion combination, with the pinion being drivable by the drive motor and being arranged on a thrust block associated with the pivot axis.

13. The concentrating solar energy system in accordance with claim 9, wherein the positioning drive is a cable pull system which can be driven by a motor.

14. The concentrating solar energy system in accordance with claim 13, wherein the cable pull system consists of a cable pull for each thrust block, with each cable pull being drivable by a worm wheel which meshes with a worm of the worm wheel transmission driven by the motor.

15. The concentrating solar energy system in accordance with claim 1, wherein the receiver is provided at one end of a carrier arm, the other end of which is pivotally attached in the region of the lower edge of the parabolic mirror, to the said support structure and is co-pivoted upwardly on upward pivoting of the parabolic mirror.

16. The concentrating solar energy system in accordance with claim 1, wherein the parabolic mirror is assembled from segments which respectively consist of extruder foam bodies, which are covered at a planar or parabolically curved surface with a mirror foil and are provided at their rear side with a skin of a fibre reinforced plastic, selected from the group consisting of glass fibre and polyester resin, wherein the segments are joined to one another.

17. The concentrating solar energy system in accordance with claim 1, wherein in that the base frame is arranged inclined to a horizontal plane, with the base frame being arranged higher in the region of the pivot axis in the upwardly pivoted state of the parabolic mirror, than further to the rear, in the region of the pivot axis in the downwardly pivoted state.

18. The concentrating solar energy system in accordance with claim 1, wherein at least one spring is provided to assist the positioning force of the motor provided for the pivoting of the parabolic mirror and is provided for the motors provided for the pivoting of the parabolic mirror.

19. The concentrating solar energy system in accordance with claim 1, wherein the parabolic mirror consists of individual non-curved trapezoidal elements, the sides of which are straight and which are obliquely cut in shape such that the elements which are joined to one another result in the desired shape of the parabolic mirror and at least some of the straight cuts form the side shape of at least two elements, whereby the elements which are joined together are cutable in a largely waste-free manner from at least one plate of material and material web and from a material web assembled from material plates.

20. A concentrating solar energy system with a reflector having a specularly reflecting inner side and realized as a parabolic mirror with two axis steering which is carried by a base frame arranged in a support plane and which is provided with a receiver arranged in operation at, in front of or after the focus of the parabolic mirror, with the parabolic mirror moreover being rotatable about an axis which stands at least substantially perpendicular to the support plane, said solar energy system comprising the parabolic mirror being pivotable upwardly and downwardly about a pivot axis arranged in at least one of the region of the support plane and at a distance above or below the support plane, with the pivot axis being displaceably arranged in at least one of a plane parallel to the support plane and in the support plane and with the displacement of the pivot axis contributing to the corresponding pivotal movement of the parabolic mirror wherein the pivotal movement of the parabolic mirror is assisted by at least one link arm which is hinged at one end in the middle region of the parabolic mirror and at the other end to the base frame, wherein the parabolic mirror is downwardly pivotable about the pivot axis to such an extent that it forms a roof in the downwardly pivoted state with said specularly reflecting inner side facing downwardly.

* * * * *